(12) United States Patent
Woo et al.

(10) Patent No.: US 12,477,906 B2
(45) Date of Patent: Nov. 18, 2025

(54) LIGHT EMITTING DISPLAY DEVICE

(71) Applicant: Samsung Display Co., Ltd., Yongin-Si (KR)

(72) Inventors: Jun Hyuk Woo, Yongin-si (KR); Hyeon Bum Lee, Hwaseong-si (KR); Yeong Ho Lee, Seongnam-si (KR); Ha Seok Jeon, Seoul (KR)

(73) Assignee: Samsung Display Co., Ltd., Yongin-Si (KR)

( * ) Notice: Subject to any disclaimer, the term of this patent is extended or adjusted under 35 U.S.C. 154(b) by 995 days.

(21) Appl. No.: 17/566,510

(22) Filed: Dec. 30, 2021

(65) Prior Publication Data

US 2022/0416216 A1    Dec. 29, 2022

(30) Foreign Application Priority Data

Jun. 28, 2021  (KR) ......................... 10-2021-0083801

(51) Int. Cl.
| | |
|---|---|
| *H10K 59/123* | (2023.01) |
| *G06F 3/041* | (2006.01) |
| *G06F 3/044* | (2006.01) |
| *H10K 59/122* | (2023.01) |
| *H10K 59/38* | (2023.01) |
| *H10K 59/40* | (2023.01) |
| *H10K 59/80* | (2023.01) |

(52) U.S. Cl.
CPC ......... *H10K 59/123* (2023.02); *G06F 3/0412* (2013.01); *G06F 3/044* (2013.01); *H10K 59/122* (2023.02); *H10K 59/8792* (2023.02); *H10K 59/38* (2023.02); *H10K 59/40* (2023.02)

(58) Field of Classification Search
CPC .................................................. H10K 59/123
See application file for complete search history.

(56) References Cited

U.S. PATENT DOCUMENTS

| | | | |
|---|---|---|---|
| 2010/0207107 A1 | 8/2010 | Kim | |
| 2016/0254331 A1 | 9/2016 | Wang | |
| 2018/0188866 A1* | 7/2018 | Heo | ..................... H10K 59/873 |

(Continued)

FOREIGN PATENT DOCUMENTS

| | | |
|---|---|---|
| EP | 3660915 A1 | 6/2020 |
| EP | 3754714 A1 | 12/2020 |

(Continued)

*Primary Examiner* — Mounir S Amer
(74) *Attorney, Agent, or Firm* — Innovation Counsel LLP

(57) ABSTRACT

A display device includes an organic layer, an anode, a pixel defining layer, a cathode, a light emitting layer, a light blocking layer, a color filter, and a sensing electrode. The organic layer includes an anode-connecting opening. The anode is disposed on the organic layer and is partially disposed inside the anode-connecting opening. The pixel defining layer includes an anode-exposing opening that exposes the anode. The cathode overlaps the anode. The light emitting layer is between the anode and the cathode. The light blocking layer overlaps the cathode and includes a blocking layer opening. The color filter fills the blocking layer opening. The sensing electrode is at least partially covered by the light blocking layer. The anode-connecting opening overlaps with each of the sensing electrode, the pixel defining layer, and the light blocking layer in a plan view of the display device.

21 Claims, 24 Drawing Sheets

(56) References Cited

U.S. PATENT DOCUMENTS

| | | | |
|---|---|---|---|
| 2020/0176651 A1 | 6/2020 | Hayashi et al. | |
| 2020/0403171 A1 | 12/2020 | Park et al. | |
| 2020/0411598 A1* | 12/2020 | Gwon | G06F 3/0443 |
| 2021/0066648 A1 | 3/2021 | Chung et al. | |
| 2021/0134906 A1 | 5/2021 | Lee et al. | |
| 2022/0093722 A1 | 3/2022 | Park et al. | |

FOREIGN PATENT DOCUMENTS

| | | |
|---|---|---|
| KR | 10-0964225 B1 | 6/2010 |
| KR | 10-2018-0021286 A | 3/2018 |
| KR | 10-2040242 B1 | 11/2019 |
| KR | 10-2109009 B1 | 5/2020 |

* cited by examiner

LIGHT EMITTING DISPLAY DEVICE

CROSS-REFERENCE TO RELATED APPLICATION

This application claims priority to and the benefit of Korean Patent Application No. 10-2021-008381 filed in the Korean Intellectual Property Office on Jun. 28, 2021; the Korean Patent Application is incorporated by reference.

BACKGROUND

1. Field

The technical field relates to a light emitting display device.

2. Description of the Related Art

A display device may display an image in response to signals. Modern display devices include liquid crystal display (LCD) devices, organic light emitting diode (OLED) display devices, and the like. Display devices may be included in various electronic devices, such as mobile phones, navigation devices, digital cameras, electronic books, portable game machines, and terminals.

SUMMARY

Embodiments are related to a light emitting display device that displays images of satisfactory quality with minimum reflectance of external light and/or minimum color spread (color separation) caused by reflected light.

An embodiment may be related a light emitting display device that includes the following elements: a substrate; an organic layer disposed on the substrate and having an anode-connecting opening; an anode disposed on the organic layer and electrically connected thereto through the anode-connecting opening of the organic layer; a black pixel defining layer having an anode-exposing opening that exposes the anode; a cathode disposed on the black pixel defining layer and the anode; an encapsulation layer covering the cathode; a light blocking layer disposed on the encapsulation layer and having a color filter opening; a color filter filling the color filter opening of the light blocking layer; and a sensing electrode overlapping the light blocking layer in a plan view and covered by the light blocking layer, wherein the anode-connecting opening of the organic layer overlaps the black pixel defining layer and the light blocking layer in a plan view, and the anode-connecting opening of the organic layer at least partially overlaps the sensing electrode in a plan view.

A center of the anode-connecting opening of the organic layer may overlap the sensing electrode in a plan view.

The organic layer may include at least two organic layers, and the anode-connecting opening may be formed in an organic layer far from the substrate among the at least two organic layers.

The organic layer may include a first organic layer, a second organic layer, and a third organic layer, and the anode-connecting opening may be formed in the second organic layer and the third organic layer.

The light emitting display device may further include an anode connecting part disposed on the first organic layer, wherein the anode may be connected to the anode connecting part through the anode-connecting opening.

The first organic layer may be provided with a first lower organic layer opening and a second lower organic layer opening; the first lower organic layer opening may overlap the black pixel definition film in a plan view, and does not overlap the light blocking layer; and the second lower organic layer opening may overlap the black pixel defining layer and the light blocking layer in a plan view.

Some of the second lower organic layer openings overlapping the anode connecting part may at least partially overlap the sensing electrode in a plan view.

The first lower organic layer opening may not overlap the sensing electrode in a plan view.

The color filter may include a first color filter, a second color filter, and a third color filter; the first color filter may include a color filter opening, and may be divided into a main part and an overlapping part connecting adjacent main parts; and the second color filter and the third color filter may be each disposed in the color filter opening of the first color filter.

The overlapping part of the first color filter may entirely overlap the light blocking layer.

The anode-connecting opening may overlap the overlapping part of the first color filter in a plan view.

The first lower organic layer opening may at least partially overlap the second color filter in a plan view.

The first color filter may be a red color filter, the second color filter may be a green color filter, and the third color filter may be a blue color filter.

The substrate may further include an second element area, wherein each of the black pixel defining layer, the light blocking layer, and the first color filter may further include an additional opening corresponding to the second element area.

The sensing electrode may include an oblique part extending in an oblique direction and a connection part having a U-shape in the vicinity of the second element area.

The anode-connecting opening of the organic layer may at least partially overlap the oblique part of the sensing electrode in a plan view.

In the second element area, a buffer layer, a first gate insulating layer, a second gate insulating layer, a first interlayer insulating layer, a third gate insulating layer, a second interlayer insulating layer, the first organic layer, the second organic layer, and the third organic layer may be sequentially stacked on the substrate.

In the second element area, a functional layer, the cathode, the encapsulation layer, and a sensing insulating layer may be further stacked on the third organic layer; the light blocking layer and the additional opening of the first color filter may be disposed on the encapsulation layer and below the sensing insulating layer; and the additional opening of the black pixel defining layer may be disposed between the third organic layer and the functional layer.

The light emitting display device may further include a first data conductive layer disposed under the first organic layer and including a first extension; and a second data conductive layer disposed on the first organic layer and including the anode connecting part and a second extension, wherein each of the first extension and the second extension may overlap the anode in a plan view.

The light emitting display device may further include a spacer disposed between the black pixel defining layer and the cathode, wherein the spacer may have a step by including a first part and a second part having a lower height than that of the first part and integrally formed with the first part.

An embodiment may be related to a light emitting display device that includes the following elements: a substrate including an second element area disposed in a display area, wherein the display area of the substrate includes: an organic layer having an anode-connecting opening; an anode disposed on the organic layer and electrically connected thereto through the anode-connecting opening of the organic layer; a black pixel defining layer having an anode-exposing opening that exposes the anode; a cathode disposed on the black pixel defining layer and the anode; an encapsulation layer covering the cathode; a light blocking layer disposed on the encapsulation layer and having a color filter opening; a color filter filling the color filter opening of the light blocking layer; a sensing electrode overlapping the light blocking layer in a plan view and covered by the light blocking layer, the anode-connecting opening of the organic layer overlaps the black pixel defining layer and the light blocking layer in a plan view, and the anode-connecting opening of the organic layer at least partially overlaps the sensing electrode in a plan view; in a light transmitting area, a buffer layer, a first gate insulating layer, a second gate insulating layer, a first interlayer insulating layer, a third gate insulating layer, a second interlayer insulating layer, the first organic layer, the second organic layer, and the third organic layer are sequentially stacked on the substrate; and a functional layer, the cathode, the encapsulation layer, and a sensing insulating layer are further stacked on the third organic layer.

In the second element area, the light blocking layer and the additional opening of the color filter may be disposed on the encapsulation layer and below the sensing insulating layer; and the additional opening of the black pixel defining layer may be disposed between the third organic layer and the functional layer.

The sensing electrode may include: a connection part having a U-shape at a periphery of the second element area so that it does not overlap the second element area; and an oblique part connecting adjacent connection parts.

An embodiment may be related to a display device. The display device may include a substrate, an organic layer, an anode, a pixel defining layer, a cathode, a light emitting layer, an encapsulation layer, a light blocking layer, a color filter set, and a sensing electrode. The organic layer may overlap the substrate and may include an anode-connecting opening. The anode may be disposed on the organic layer and may be partially disposed inside the anode-connecting opening. The pixel defining layer may include an anode-exposing opening that exposes the anode. The cathode may overlap each of the pixel defining layer and the anode. The light emitting layer may be disposed between the anode and the cathode. The encapsulation layer may cover the cathode. The light blocking layer may overlap the encapsulation layer and may include a first blocking layer opening. The color filter set may fill the first blocking layer opening. The sensing electrode may be at least partially covered by the light blocking layer. The anode-connecting opening may overlap with each of the sensing electrode, the pixel defining layer, and the light blocking layer in a plan view of the display device.

A center of the anode-connecting opening may overlap with the sensing electrode in the plan view of the display device.

The organic layer may include a first organic layer, a second organic layer, and a third organic layer overlapping each other. The anode may directly contact each of the second organic layer and the third organic layer.

The display device may include an anode connecting part disposed on the first organic layer. The anode may be directly connected to the anode connecting part through the anode-connecting opening.

The first organic layer may include a first organic layer opening and a second organic layer opening. The first organic layer opening may overlap with the pixel definition film and may not overlap with the light blocking layer in the plan view of the display device. The second organic layer opening may overlap each of the pixel defining layer and the light blocking layer in the plan view of the display device.

The second organic layer opening may overlap with each of the anode connecting part and the sensing electrode in the plan view of the display device. The first organic layer opening may not overlap with the sensing electrode in the plan view of the display device.

The color filter set may include a first color filter, a second color filter, and a third color filter of a first color, a second color, and a third color, respectively. The first color, the second color, and the third color may be different from each other. The first color filter may include two color filter openings spaced from each other, a main part filling the first blocking layer opening and spaced from the two color filter openings, and an overlapping part directly connected to the main part. The second color filter and the third color filter may be respectively disposed the two color filter openings.

The overlapping part may overlap the light blocking layer.

The anode-connecting opening may overlap with the overlapping part in the plan view of the display device.

The first organic layer opening may overlap with the second color filter in the plan view of the display device. The first color filter may be a red color filter, the second color filter may be a green color filter, and the third color filter may be a blue color filter.

The substrate may include a light transmitting area. Each of the pixel defining layer, the light blocking layer, and the first color filter may include a light-transmitting opening corresponding to the light transmitting area.

The sensing electrode may include an oblique part and a connection part. The oblique part extends oblique relative to an edge of the display device in the plan view of the display device. The connection part may have a U-shaped structure and may partially surround the light transmitting area.

The anode-connecting opening of the organic layer may overlap with the oblique part of the sensing electrode in the plan view of the display device.

Portions of a buffer layer, a first gate insulating layer, a second gate insulating layer, a first interlayer insulating layer, a third gate insulating layer, a second interlayer insulating layer, the first organic layer, the second organic layer, and the third organic layer may be sequentially stacked on the light transmitting area of the substrate.

Portions of a functional layer, the cathode, the encapsulation layer, and a sensing insulating layer may be stacked on the third organic layer on the light transmitting area of the substrate. The sensing insulating layer may be disposed between the light blocking layer and the encapsulation layer. The light transmitting opening of the pixel defining layer may be disposed between the third organic layer and the functional layer.

The display device may include the following elements: a first data conductive layer disposed between the substrate and the first organic layer and including a first extension; and a second data conductive layer disposed on the first organic layer and including the anode connecting part and a second extension. Each of the first extension and the second extension may overlap with the anode in the plan view of the display device.

The display device may include a spacer disposed between the pixel defining layer and the cathode. The spacer may include a first part and may include a second part shorter than the first part in a direction perpendicular to the substrate and integrally formed with the first part.

The second part may overlap with the anode-connecting opening in the plan view of the display device.

The first part may not overlap with the anode-connecting opening in the plan view of the display device. The second part may partially overlap with the anode-connecting opening in the plan view of the display device.

The substrate may include two light transmitting areas that are spaced from each other. The sensing electrode may include an oblique part and two U-shaped structures. The oblique part may extend oblique relative to one or more members of the two U-shaped structures. The two U-shaped structures may respectively partially surround the two light transmitting areas in the plan view of the display device and may be electrically connected to each other through the oblique part.

According to embodiments, reflectance of external light may be minimized by a black pixel defining layer that separates emission layers from each other instead of a polarizing plate. Because an anode-connecting opening (on which external light is reflected) is disposed under a black pixel defining layer to improve flatness of an exposed anode to prevent reflected light from being asymmetrically spread, color spread (color separation) caused by the reflected light may be minimized. Advantageously, quality of displayed images may be satisfactory.

DETAILED DESCRIPTION

Figure 1:
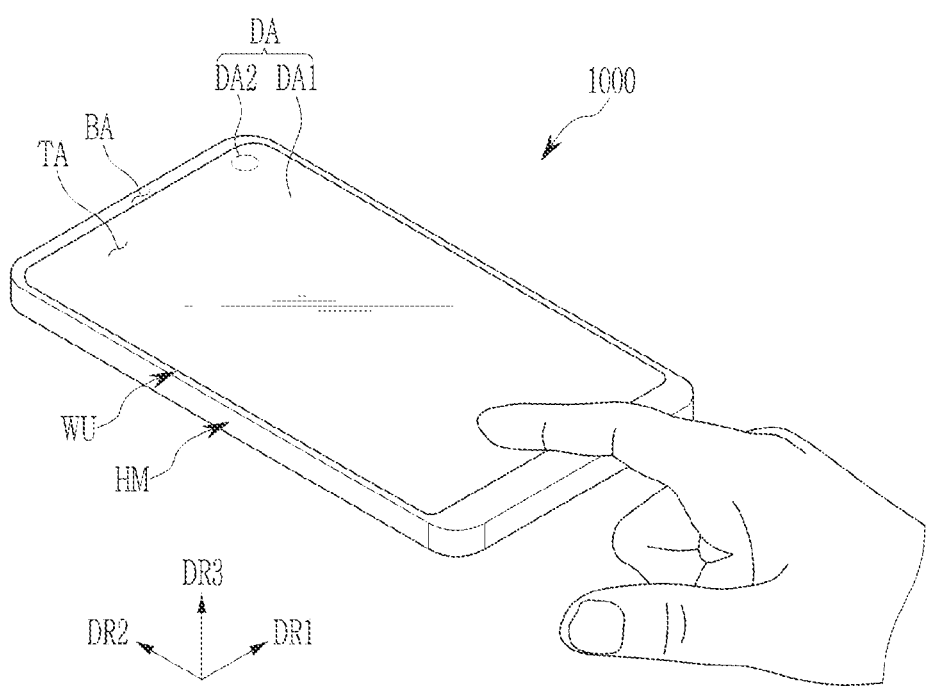
FIG. 1 illustrates a schematic perspective view of a display device touched by a user's finger according to an embodiment.

Examples of embodiments are described with reference to the accompanying drawings. The described embodiments may be modified in various ways.

Identical or similar elements may be denoted by the same reference numerals.

In the drawings, dimensions may be exaggerated for clarity.

Although the terms "first," "second," etc. may be used to describe various elements, these elements should not be limited by these terms. These terms may be used to distinguish one element from another element. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-category (or first-set)," "second-category (or second-set)," etc., respectively.

When a first element is referred to as being "on" a second element, the first element can be directly on the second element, or one or more intervening elements may be present between the first element and the second element. When a first element is referred to as being "directly on" a second element, there are no intended intervening elements (except for environmental elements such as air) present between the first element and the second element.

The terms "upper" and "lower" may be with reference to a substrate of a device and/or a back face of a device. The terms "above" and "below" may be in a direction perpendicular to a back face of a device and/or in a thickness direction of the device. The term "connect" may mean "directly connect" or "indirectly connect." The term "connect" may mean "mechanically connect" and/or "electrically connect." The term "connected" may mean "electrically connected" or "electrically connected through no intervening transistor." The term "insulate" may mean "electrically insulate" or "electrically isolate." The term "conductive" may mean "electrically conductive." The term "drive" may mean "operate" or "control." The term "include" may mean "be made of." The term "adjacent" may mean "immediately adjacent." The expression that an element extends in a particular direction may mean that the element extends lengthwise in the particular direction and/or that the lengthwise direction of the element is in the particular direction. The term "pattern" may mean "member." The term "defined" may mean "formed" or "provided." The expression that a space or opening overlaps (with) an object may mean that (the position of) the space or opening overlaps with (the position of) the object. The expression that a first element overlaps with a second element in a plan view of a device may mean that the first element and the second element are in the same position in the plan view of the device and/or that (the position of) the first element overlaps (with) (the position of) the second element in a cross-sectional view of the device in a direction perpendicular to a substrate of the device. A listing of materials or items may mean at least one of the materials or items.

Unless explicitly described to the contrary, the word "comprise" and variations such as "comprises" or "comprising" may indicate the inclusion of the stated elements but may not indicate the exclusion of any other elements.

Figure 2:
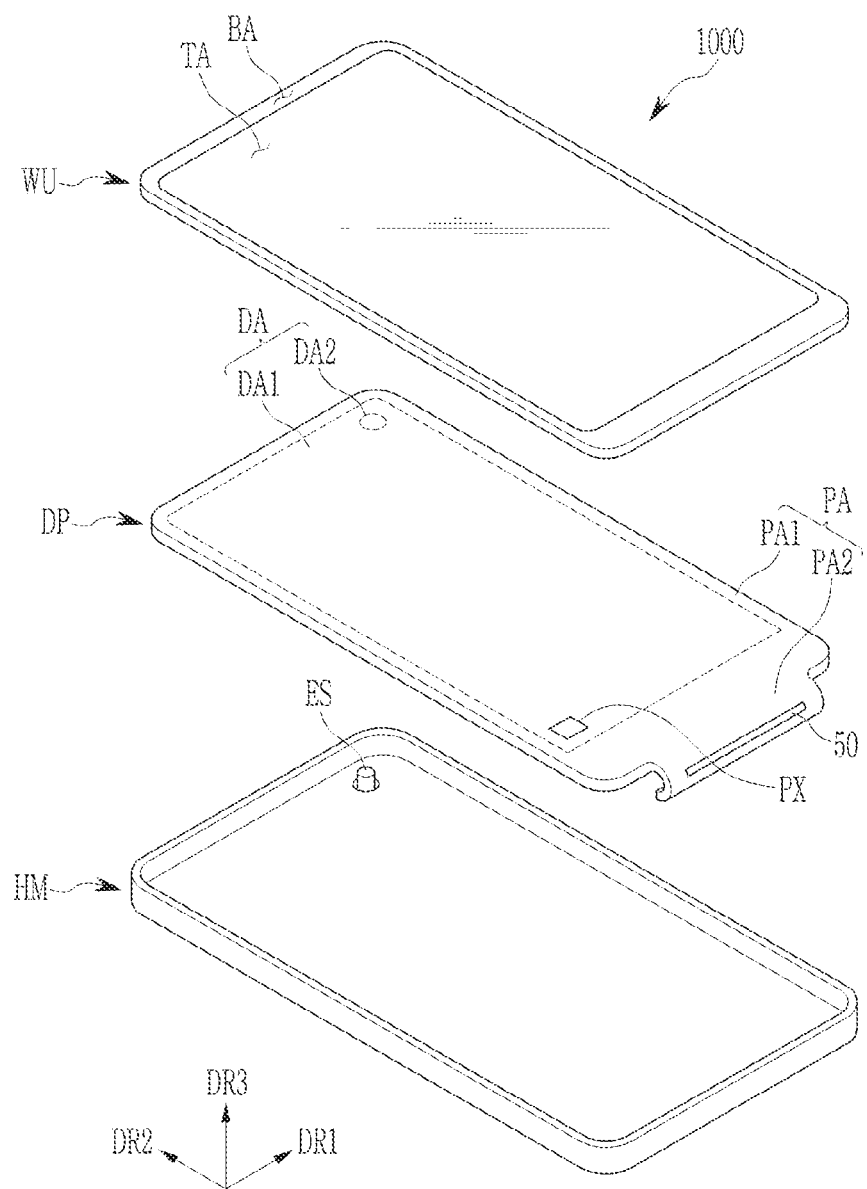
FIG. 2 illustrates an exploded perspective view of a display device according to an embodiment.
Figure 3:
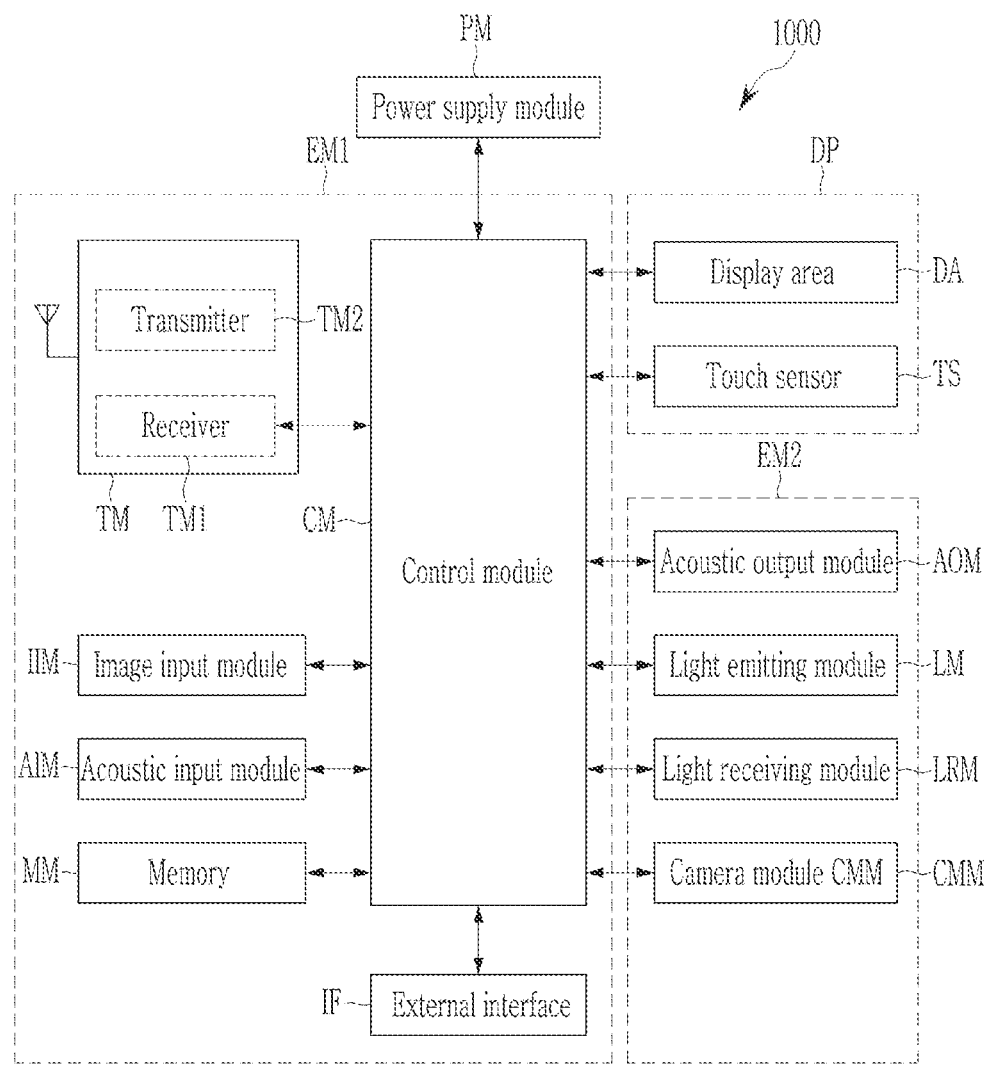
FIG. 3 illustrates a block diagram of a display device according to an embodiment.

FIG. 1 illustrates a schematic perspective view of a use state of a display device according to an embodiment. FIG. 2 illustrates an exploded perspective view of a display device according to an embodiment. FIG. 3 illustrates a block diagram of a display device according to an embodiment.

A light emitting display device 1000 may display a moving image or a still image in response to input signals, and may be used as a display screen of an electronic device. For example, the electronic device may be a mobile phone, a smart phone, a tablet personal computer (PC), a mobile communication terminal, an electronic note, an electronic book, a portable multimedia player (PMP), a navigation device, an ultra-mobile PC (UMPC), a television set, a laptop computer, a monitor, a billboard, or an Internet of things (IOT) device, a smart watch, a watch phone, a glasses display, a head mounted display (HMD), an instrument panel of a vehicle, a center information display (CID) disposed on a center fascia or dashboard of a vehicle, a room mirror display that replaces a side mirror of a vehicle, or a display disposed on the back of a front seat for entertainment for a rear seat of a vehicle. FIG. 1 illustrates that the light emitting display device 1000 is (included in) a smart phone.

Referring to FIG. 1, FIG. 2, and FIG. 3, the light emitting display device 1000 may display an image in a third direction DR3 on a display surface parallel to each of a first direction DR1 and a second direction DR2. A display surface on which an image is displayed may correspond to a front surface of the light emitting display device 1000, and may correspond to a front surface of a cover window WU. The image may include a static image and/or a dynamic image.

A front (or top) surface and a rear (or bottom) surface of a member are defined based on a direction in which an image is displayed. The front and rear surfaces may be opposite each other in the third direction DR3, and a normal direction of each of the front and rear surfaces may be in the third direction DR3. A separation distance in the third direction DR3 between the front and rear surfaces may correspond/equal to a thickness of a light emitting display panel DP in the third direction DR3.

The light emitting display device 1000 may detect a user's input (e.g., by a hand of the user). The user's input may include/be one or more types of external inputs, such as a touch by a part of the user's body, light, heat, or pressure. The user's input may be a touch by the user's hand on the front surface. The light emitting display device 1000 may sense the user's input applied to the lateral or rear surface of the light emitting display device 1000 according to the structure of the light emitting display device 1000.

The light emitting display device 1000 may include a display area DA and non-display area PA disposed around the display area DA. The display area DA may include a first display area DA1 and a first element area DA2 (hereinafter also referred to as a component area or a second display area). The first display area DA1 may include a plurality of pixels for displaying an image. The first element area DA2 may include a light transmitting area and may include pixels that display part of the image or another image. The first element area DA2 may at least partially overlap (with) an optical element ES such as a camera or an optical sensor. FIG. 1 shows that the first element area DA2 is provided in a circle shape at an upper right side of the light emitting display device 1000. The first element area DA2 may be provided in various numbers and shapes according to the number and shape(s) of the optical elements ES.

The light emitting display device 1000 may receive an external signal required for the optical element ES through the first element area DA2, or may provide a signal outputted from the optical element ES to the outside. The first element area DA2 may overlap the light transmitting area, so that an area of a blocking area BA may be reduced. The blocking area BA may have a relatively low light transmittance compared with a transmission area TA, and may include/be a bezel area.

The light emitting display device 1000 may include the cover window W U, a housing HM, the light emitting display panel DP, and the optical element ES. The cover window W U and the housing HM may be combined to form an appearance of the light emitting display device 1000.

The cover window WU may include an insulating panel. The cover window WU may be made of glass and/or plastic.

A front surface of the cover window WU may be the front surface of the light emitting display device 1000. The transmission area TA may be an optically transparent area. The transmission area TA may have visible ray transmittance of about 90% or more.

The blocking area BA may define a shape of the transmission area TA. The blocking area BA may abut the transmission area TA and may surround the transmission area TA. The blocking area BA may have relatively low light transmittance compared with the transmission area TA. The blocking area BA may include an opaque material that blocks light. The blocking area BA may have a predetermined color. The blocking area BA may be defined by a bezel layer provided separately from a transparent substrate defining the transmission area TA, or may be defined by an ink layer inserted into or colored on the transparent substrate.

The light emitting display panel DP may include a display area DA for displaying an image, a touch sensor TS for sensing an external input, and a driver 50. The light emitting display panel DP may include a front surface that includes a display area DA and a non-display area PA. The display area DA may include at least one pixel configured to emit light according to an electrical signal.

The display area DA may include pixels for displaying an image and may be overlapped by the touch sensor TS in the third direction DR3.

The transmission area TA of the cover window WU may overlap the display area DA of the light emitting display panel DP. The transmission area TA may complete overlap the front surface of the display area DA, or may overlap a portion of the display area DA. A user may view an image through the transmission area TA and may provide an input based on the image. The display area DA may include an area in which an image is displayed and may include an area in which an external input is sensed.

The non-display area PA of the light emitting display panel DP may overlap the blocking area BA of the cover window WU. The non-display area PA may be covered by the blocking area BA. The non-display area PA may abut the display area DA and may surround the display area DA. No image is displayed in the non-display area PA in response to input signals, and a driving circuit or driving wire for driving the display area DA may be disposed in the non-display area PA. The non-display area PA may include a first peripheral area PA1 substantially surrounding the display area DA and may include a second peripheral area PA2 including the driver 50, a connection wire, and a bending area. The first peripheral area PA1 may abut three sides of the display area DA, and the second peripheral area PA2 may abut the fourth side of the display area DA.

The light emitting display panel DP may be in a flat state under the cover window WU. A portion of the non-display area PA of the light emitting display panel DP may be bent. In this case, a portion of the non-display area PA is disposed between the display area DA and the rear surface of the light emitting display device 100, so that the blocking area BA shown on the front surface of the light emitting display device 1000 may be reduced.

The display area DA may include a first display area DA1 and a first element area DA2. The first element area DA2 includes the light transmitting area and may have a relatively high light transmittance compared with the first display area DA1. The first element area DA2 may be smaller than the first display area DA1. The first element area DA2 may overlap the optical element ES (which is disposed inside the housing HM). The first element area DA2 may have a circular shape. The first element area DA2 may have one or more of various shapes, such as a polygon, an ellipse, and a shape with at least one curve.

The first display area DA1 may be adjacent to the first element area DA2. The first display area DA1 may entirely surround the first element area DA2. The first display area DA1 may partially surround the first element area DA2.

Referring to FIG. 3, the light emitting display panel DP may include the display area DA and the touch sensor TS. The light emitting display panel DP may be viewed by a user from the outside through the transmission area TA. The touch sensor TS may be disposed on the display area DA and may sense an external input. The touch sensor TS may sense an external input provided to the cover window WU.

Referring back to FIG. 2, the second peripheral area PA2 may include a bending part. The display area DA and the first peripheral area PA1 may be flat and substantially parallel to a plane defined by the first direction DR1 and the second direction DR2. The second peripheral area PA2 may include two flat parts connected to each other through a bending/bent part. A portion of the second peripheral area PA2 may be disposed on the rear surface side of the display area DA. Advantageously, the blocking area BA of the light emitting display device 1000 may be reduced. The second peripheral area PA2 may not be bent.

The driver 50 may be mounted on the second peripheral area PA2, mounted on the bending part, and/or disposed at one side of the bending part. The driver 50 may be a chip.

The driver 50 may be electrically connected to the display area DA to transmit electrical signals to the display area DA. The driver 50 may provide data signals to pixels PX disposed in the display area DA. The driver 50 may include a touch driving circuit, and may be electrically connected to the touch sensor TS disposed in the display area DA. The driver 50 may include one or more circuits in addition to the above-described circuits, and/or may provide other electrical signals to the display area DA.

A pad part may be disposed at an end of the second peripheral area PAZ and the light emitting display device 1000 may be electrically connected to a flexible printed circuit board (FPCB) including a driving chip by the pad part. The driving chip disposed on the flexible printed circuit board may include driving circuits for driving the light emitting display device 1000 or connectors for supplying of power. Instead of the flexible printed circuit board, a rigid printed circuit board (PCB) may be used.

The optical element ES may be disposed under the light emitting display panel DP. The optical element ES may receive an external input transmitted through the first element area DA2, or may output a signal through the first element area DA2 The first element area DA2 is provided inside the display area DA, so that the area (or size) of the blocking area BA may be reduced.

Referring to FIG. 3, the light emitting display device 1000 may include the light emitting display panel DP, a power supply module PM, a first electronic module EM1, and a second electronic module EM2. The light emitting display panel DP, the power supply module PM, the first electronic module EM1, and the second electronic module EM2 may be electrically connected to each other.

The power supply module PM may supply power required for an overall operation of the light emitting display device 1000. The power supply module PM may include a battery module.

The first electronic module EM1 and the second electronic module EM2 may include functional modules for operating the light emitting display device 1000. The first electronic module EM1 may be directly mounted on a motherboard electrically connected to the display panel DP, or mounted on a separate substrate to be electrically connected to the motherboard through a connector (not shown).

The first electronic module EM1 may include a control module CM, a wireless communication module TM, an image input module IIM, an audio input module AIM, a memory MM, and an external interface IF. Some of the modules are not mounted on the motherboard, but may be electrically connected to the motherboard through the flexible printed circuit board.

The control module CM may control the overall operation of the light emitting display device 1000. The control module CM may be a microprocessor. The control module CM activates or deactivates the display panel DP. The control module CM may control other modules such as the image input module IIM or the audio input module AIM based on a touch signal received from the display panel DP.

The wireless communication module TM may transmit and receive wireless signals, such as Bluetooth signals and/or Wi-Fi signals. The wireless communication module TM may transmit and receive signals for voice communication. The wireless communication module TM includes a transmitter TM1 that modulates and transmits a signal to be transmitted, and a receiver TM2 that demodulates a received signal.

The image input module IIM may process an image signal to convert it into image data that may be displayed on the light emitting display panel DP. The audio input module AIM may receive an external audio signal inputted by a microphone in a recording mode, a voice recognition mode, etc. and convert it into electrical voice data.

The external interface IF may serve as an interface connected to an external charger, a wired/wireless data port, a card socket (for example, a memory card, a SIM/UIM card), and the like.

The second electronic module EM2 may include an audio output module AOM, a light emitting module LM, a light receiving module LRM, and a camera module CMM, and at least some of them are optical elements ES and may be disposed on the rear surface of the display area DA as shown in FIG. 1 and FIG. 2. The optical element ES may include the light emitting module LM, the light receiving module LRM, and the camera module CMM. The second electronic module EM2 may be directly mounted on the motherboard, mounted on a separate substrate to be electrically connected to the light emitting display panel DP through a connector (not shown), or electrically connected to the first electronic module EM1.

The audio output module AOM may convert audio data received from the wireless communication module TM or audio data stored in the memory MM to output it to the outside.

The light emitting module LM may generate and output light. The light emitting module LM may output infrared rays. The light emitting module LM may include an LED element. The light receiving module LRM may detect infrared rays. The light receiving module LRM may be activated when infrared rays of a predetermined level or more are sensed. The light receiving module LRM may include a CMOS sensor. After the infrared light generated by the light emitting module LM is outputted, it may be reflected by an external subject (for example, a user's finger or face), and then the reflected infrared light may be incident on the light receiving module LRM. The camera module CMM may capture an external image.

The optical element ES may include a light sensing sensor or a thermal sensing sensor.

Referring back to FIG. 2, the housing HM may be combined with the cover window WU to provide a predetermined accommodation space. The cover window WU may be disposed on the front surface of the housing HM. The light emitting display panel DP and the optical element ES may be accommodated in the predetermined accommodation space.

The housing HM may include a material with relatively high rigidity. The housing HM may include a plurality of frames and/or plates made of glass, plastic, and/or metal. The housing HM may stably protect the components of the light emitting display device 1000 from external impact.

Figure 4:
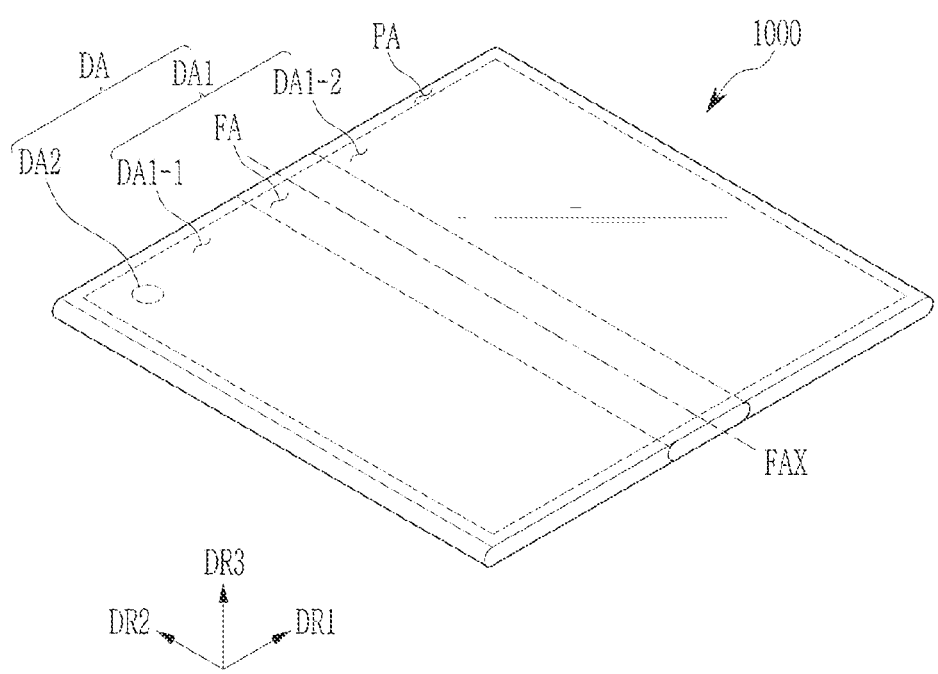
FIG. 4 illustrates a schematic perspective view of a light emitting display device according to an embodiment.

FIG. 4 illustrates a schematic perspective view of a light emitting display device according to an embodiment.

FIG. 4 illustrates a foldable light emitting display device 1000 that is folded at a folding line FAX.

In the foldable light emitting display device 1000, the first element area DA2 (hereinafter also referred to as a component area) may be disposed near an edge and/or a corner.

An optical element such as a camera or an optical sensor is disposed behind the first element area DA2, and the light transmitting area is disposed in the first element area DA2.

The light emitting display device 1000 may be folded outwardly or inwardly based on the folding axis FAX. When the light emitting display device 1000 is folded outwardly, display surfaces are positioned at outer sides in the third direction DR3, so that images may be displayed in two opposite directions. When the light emitting display device 1000 is folded inwardly based on the folding axis FAX, the display surfaces may be concealed.

The light emitting display device 1000 may include a housing, a light emitting display panel, and a cover window.

The light emitting display panel may include the display area DA and the non-display area PA. The display area DA may display an image and may sense an external input. The display area DA may include a plurality of pixels.

The display area DA may include a first display area DA1 and a first element area DA2. The first display area DA1 may include a display area DA-1, a display area DA1-2 and a folding area FA. The display area DA1-1 and the display area DA1-2 may be disposed at the left and right sides, respectively, relative to the folding axis FAX, and the folding area FA may be disposed between the display area DA1-1 and the display area DA1-2. When the display device 1000 is folded outwardly based on the folding axis FAX, the display area DA-1 and the display area DA1-2 are disposed at two opposite sides in the third direction DR3, and an image may be displayed in two opposite directions. When the display device 1000 is folded inwardly based on the folding axis FAX, the display area DA1-1 and the display area DA1-2 may be concealed.

The light emitting display panel DP may have a second element area (OPS shown in FIG. 5) adjacent to the first element area DA2.

Figure 5:
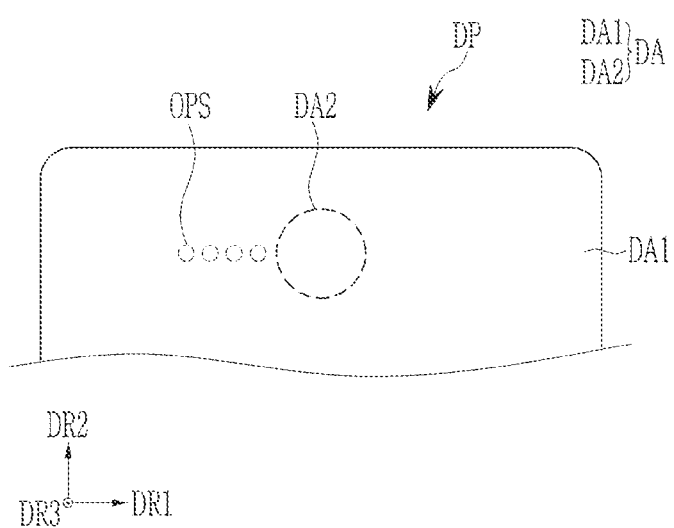
FIG. 5 illustrates a partial top plan view of a light emitting display device according to an embodiment.

FIG. 5 illustrates a partial top plan view of a light emitting display panel DP of a light emitting display device according to an embodiment.

The light emitting display area DA is disposed at the front surface of the display panel DP, and the display area DA may include the first display area DA1 (hereinafter also referred to as a main display area) and the first element area DA2. The second element area OPS, hereinafter also referred to as an optical sensor area, is disposed in the first display area DA1 and is positioned adjacent to the first element area DA2. The second element area OPS may be disposed to the left of the first element area DA2 The display area DA may include multiple second element areas OPS near the first element area DA2 The corresponding optical element for the first element area DA2 may be a camera, and the corresponding optical element for the/a second element area OPS may be an optical sensor. The second element area OPS may be include light transmitting parts, and may not display an image. The second element area OPS and pixels disposed adjacent to the second element area OPS may be collectively called as a third display area. The position and number of the second element area OPS may vary according to embodiments.

A plurality of light emitting diodes and a plurality of pixel circuits that provide light emitting signals to the plurality of light emitting diodes are formed in the first display area DA1. One light emitting diode and one pixel circuit may substantially constitute a pixel PX. One pixel circuit may correspond to one light emitting diode in the first display area DA1. The first display area DA1 is also referred to as a 'normal display area'. The first display area DA1 may extend beyond the cutting line shown in FIG. 5.

In a second element area OPS, transparent layers are formed to allow light to pass through it, and no conductive layer or semiconductor layer is disposed, and an opening (hereinafter also referred to as an additional opening or light transmitting opening) is formed in a black pixel defining layer 380, a light blocking layer 220, and a color filter 230 (shown in FIGS. 9 to 24) at a position corresponding to the second element area OPS so that light is not blocked.

The first element area DA2 is positioned in of an optical element, and includes a plurality of pixels and a light transmitting area positioned between adjacent pixels.

In the light transmitting area, transparent layers are formed to allow light to pass through it, and no conductive layer or semiconductor layer is disposed, and an opening (hereinafter also referred to as a light transmitting area opening) is formed in a black pixel defining layer 380, a light blocking layer 220, and a color filter 230 (shown in FIGS. 9 to 24) at a position corresponding to the light transmitting area so that light is not blocked. The transparent material includes an inorganic insulating layer or an organic insulating layer, and may additionally include a functional layer FL (shown in FIGS. 9 to 24).

An inorganic insulating buffer layer 111 (see FIG. 24), a first organic layer 181 (see FIG. 24), a functional layer FL (see FIG. 24), and an encapsulation layer 400 (see FIG. 24) may be disposed on a substrate. A functional layer, a first inorganic encapsulation layer 401 (see FIG. 24), an organic encapsulation layer 402 (see FIG. 24), and a second inorganic encapsulation layer 403 (see FIG. 24) may be sequentially formed on the first organic layer. The functional layer may be optional. Sensing insulating layers 501, 510, and 511

(see FIG. 24) and a planarization layer 550 (see FIG. 24) may be disposed on the encapsulation layer 400 in the light transmitting area.

Although not shown in FIG. 5, a peripheral area may be disposed outside the display area DA. In embodiments, positions of the first element area DA2 and the second element area OPS may be different from those illustrated in FIG. 5.

Figure 6:
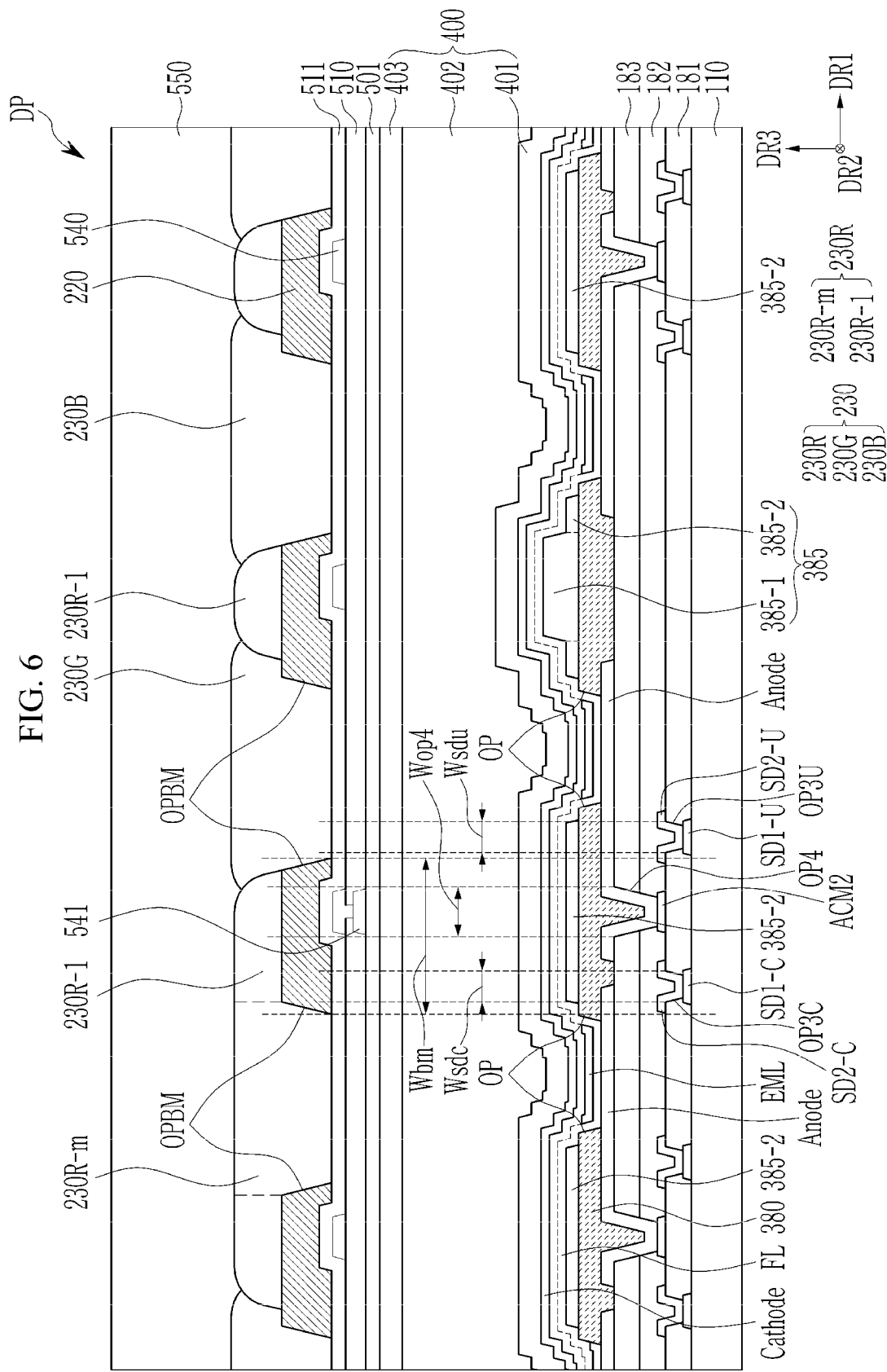
FIG. 6 illustrates a schematic cross-sectional view of a light emitting display device according to an embodiment.

FIG. 6 illustrates a schematic cross-sectional view of a light emitting display panel DP of a light emitting display device according to an embodiment.

The light emitting display panel DP may include light emitting diodes for displaying an image and may include sensing electrodes 540 and 541 for sensing a touch. Light emitted from the light emitting diodes may be partially blocked by the light blocking layer 220 and may be filtered by the color filters 230R, 230G, and 230B to have color characteristics of the color filters 230R, 230G, and 230B.

No polarizing plate is formed on the front surface of the light emitting display panel DP. Instead, the black pixel defining layer 380, the light blocking layer 220, and the color filters 230 (or color filter set 230) are formed on the anodes (Anode). External light reflected by the anodes (Anode) may be blocked by one or more of the (black) pixel defining layer 380, the light blocking layer 220, and the color filters 230 and may not be transmitted to a user.

In the light emitting display panel DP, the anode is flat, so that light provided from the outside does not asymmetrically spread at the anode, for reducing color spread (color separation) potentially caused by the reflected light. Advantageously, satisfactory image display quality may be attained.

In the light emitting display panel DP, the black pixel defining layer 380 (which covers the peripheries of the anodes and separates light emitting layers EML of the light emitting diodes) is made of a (black color) organic material including a light blocking material. Light reflected from a portion of the anode (Anode) exposed through an opening OP (hereinafter also referred to as an anode-exposing opening) of the black pixel defining layer 380 may be partially blocked by one or more of the (black) pixel defining layer 380, the light blocking layer 220, and the color filters 230. The exposed portion of the anode (Anode) is flat, so that light is not asymmetrically reflected at the anode (Anode).

The anode (Anode) may be partially disposed inside an opening OP4 (hereinafter referred to as an anode-connecting opening) for being electrically connected to one end of a pixel circuit part disposed between the pixel defining layer 380 and the substrate 110 in the third direction DR3. The light reflected from the portion of the anode (Anode) inside the opening OP4 is substantially asymmetrical. The anode-connecting opening OP4 is covered by the black pixel defining layer 380 and the light blocking layer 220 (in a plan view of the display panel DP). A width (Wbm) of a section of the light blocking layer 220, which has a narrower width than a corresponding section of the black pixel defining layer 380, is larger than a width (Wop4) of the corresponding anode-connecting opening OP4. The light blocking layer 220 completely overlaps/covers the width (Wop4) of the anode-connecting opening OP4 in a plan view of the display panel DP.

The anode-connecting opening OP4 is partially or completely covered by at least one of the sensing electrodes 540 and 541. A center of the anode-connecting opening OP4 may overlap with (and be covered by) at least one of the sensing electrodes 540 and 541.

A spacer 385 (hereinafter referred to as a main spacer) having a stepped structure is formed on the black pixel defining layer 380. The spacer 385 may include a first portion 385-1 having a predetermined high height and may include a second portion 385-2 shorter than the first portion 385-1 in the third direction DR3 and abutting and/or surrounding the first portion 385-1. The stepped structure of the spacer 385 may increase scratch resistance of the light emitting display panel DP to reduce defects potentially caused by pressing pressure. The stepped structure of the spacer 385 may also increase adhesive force between the spacer 385 and the functional layer FL disposed on the spacer 385 to block moisture and air. The increased adhesive force may be especially advantageous when the light emitting display panel DP is flexible and is repeatedly folded and unfolded.

The light blocking layer 220 has an opening OPBM (hereinafter referred to as an opening for a color filter or blocking layer opening) corresponding to each of the color filters 230R, 230G, and 230B. Each of the color filters 230R, 230G, and 230B fills a corresponding opening OPBM. The red color filter 230R has color filter openings OPCrg and OPCrb (see FIG. 8 and FIG. 9) respectively filled by the color filters 230G and 230B. Portions of the red color filters (i.e., overlapping portions 230R-1) substantially or entirely cover the light blocking layer 220. Main red color filters 230R-m (hereinafter also referred to as a main part) fill the corresponding openings OPBM of the light blocking layer 220. Overlapping parts 230R-1 may connect main parts 230R-m to each other in a plan view of the display panel DP. The color filters 230G and 230B may fill the corresponding openings OPBM, may be partially disposed outside the corresponding openings OPBM, and may substantially fill the corresponding color filter openings OPCrg and OPCrb.

The substrate 110 may include a rigid material such as glass, may include a flexible material such as plastic or polyimide, and/or may or may not be bent.

Pixels are formed on the substrate 110. A pixel includes a light emitting diode and a pixel circuit part. The pixel circuit part includes transistors and a capacitor for transmitting a light emitting current to the light emitting diode.

FIG. 6 illustrates data conductive layers SD1-C, SD1-U, SD2-C, and SD2-U of the pixel circuit part. Organic layers (a first organic layer 181, a second organic layer 182, and a third organic layer 183) are disposed on the data conductive layers. The anode (Anode) of the light emitting diode is disposed on the third organic layer 183, and the pixel circuit part connected to the light emitting diode is disposed between the third organic layer 183 and the substrate 110. A plurality of layers may be disposed between the substrate 110 and the data conductive layers.

Three organic layers are included in order to improve a flatness characteristic of the anode (Anode), and two organic layers (the second organic layer 182 and the third organic layer 183) are formed on the data conductive layer SD2-C and SD2-U. The anode (Anode) is electrically connected to an anode connecting part ACM2 through the anode-connecting opening OP4 formed in the second organic layer 182 and the third organic layer 183.

The anode (Anode) is electrically connected through the anode connecting part ACM2 to one end of the pixel circuit part disposed below in the third direction DR3. In a region of the anode-connecting opening OP4, the anode (Anode) has a largest step, and the light reflected from this region may be substantially asymmetrical. The anode-connecting opening OP4 overlaps with the black pixel defining layer 380 and the light blocking layer 220 in a plan view of the display panel, so that it is covered. The width (Wbm) of the corresponding portion of the light blocking layer 220 is larger than the width (Wop4) of the anode-connecting opening OP4, and the light blocking layer 220 covers the whole width (Wop4) of the anode-connecting opening OP4. Portions of the black pixel defining layer 380 also completely overlap and cover the corresponding anode-connecting opening OP4 in a plan view of the display panel DP.

The anode-connecting opening OP4 is partially or completely covered by at least one of the sensing electrodes 540 and 541.

The anode-connecting opening OP4 may overlap with the corresponding overlapping part 230R-1 in a plan view of the display panel DP.

The data conductive layers SD2-U and SD2-C may be respectively directly connected to the data conductive layers SD1-U and SD1-C through openings OP3U and OP3C (hereinafter also referred to as a lower organic layer openings or organic layer openings) formed in the first organic layer 181.

The first lower organic layer opening OP3U connects the data conductive layer SD1-U and the data conductive layer SD2-U. The first lower organic layer opening OP3U overlaps with the black pixel defining layer 380, but does not overlap with the light blocking layer 220 in a plan view of the display panel DP. The first lower organic layer opening OP3U is not covered by the light blocking layer 220, but is covered by the black pixel defining layer 380. In some embodiments, the first lower organic layer opening OP3U may be partially covered by the light blocking layer 220. The first lower organic layer opening OP3U may overlap with the opening OPBM of the light blocking layer 220 and the corresponding color filter (e.g., a green color filter) in a plan view of the display panel DP.

The second lower organic layer opening OP3C connects the data conductive layer SD1-C and the data conductive layer SD2-C. The second lower organic layer opening OP3C overlaps with each of the black pixel defining layer 380 and the light blocking layer 220 in a plan view of the display panel DP. The second lower organic layer opening OP3C is covered by each of the light blocking layer 220 and the black pixel defining layer 380.

A lower organic layer opening OP3U/OP3C may or may not overlap with at least one of the sensing electrodes 540 and 541 in a plan view of the display panel DP.

A light emitting diode including the anode (Anode), the light emitting layer EML, and a cathode (Cathode) is disposed on the third organic layer 183.

The anode (Anode) may have a single layer or multilayer structure including at least one of a transparent conductive oxide film and a metal material. The transparent conductive oxide film may include an indium tin oxide (ITO), a poly-ITO, an indium zinc oxide (IZO), an indium gallium zinc oxide (IGZO), and/or an indium tin zinc oxide (ITZO); the metal material may include silver (Ag), molybdenum (Mo), copper (Cu), gold (Au), and/or aluminum (Al).

The light emitting layer EML may be made of an organic light emitting material. Adjacent light emitting layers EML may display different colors. In some embodiments, all the light emitting layers EML may display light of the same color and may correspond to different color filters 230R, 230G, and 230B.

The black pixel defining layer 380 is disposed on the organic layer 180 and the anode (Anode). An opening is formed in the black pixel defining layer 380 and partially exposes the anode (Anode). The light emitting layer EML is disposed on the portion of the anode (Anode) exposed by the opening. The light emitting layer EML may be disposed within the corresponding opening of the black pixel defining layer 380 and is separated from other light emitting layers EML by the black pixel defining layer 380. The black pixel defining layer 380 may be made of an organic material having a negative type of black color. The organic material may include a light blocking material, and the light blocking material may include at least one of a carbon black, a carbon nanotube, a resin or paste containing a black dye, a metal particle such as nickel, aluminum, molybdenum, and an alloy thereof, and a metal oxide particle (for example, chromium nitride). The black pixel defining layer 380 may absorb/block light and may not substantially reflect light. Since it is formed of a negative type of organic material, portions of the material covered by a mask may be removed to form the layer 380.

The black pixel defining layer 380 may be formed of a negative type material, and the spacer 385 may be formed of a positive type material. They may include the same material.

The spacer 385 is formed on the black pixel defining layer 380. The spacer 385 includes a first part 385-1 that is relatively tall and narrow and may include a second part 385-2 that is relatively short and wide. In FIG. 6, the first part 385-1 and the second part 385-2 are separated by a dotted line in the spacer 385, but they may be integrally formed as one spacer. The first part 385-1 may serve to secure rigidity against pressing pressure with strengthened scratch resistance. The second part 385-2 may maximize contact and/or adhesion between the black pixel defining layer 380 and the functional layer FL. The first part 385-1 and the second part 385-2 are made of the same material, and may be made of a positive type of photosensitive organic material, for example, a photosensitive polyimide (PSPI). Since it has a positive characteristic, portions that are not covered by a mask may be removed to form the spacer 385. The spacer 385 is transparent, so that light may be transmitted and/or reflected.

Most of an upper surface of the black pixel defining layer 380 is covered by the spacer 385, and an edge of the second part 385-2 is spaced from an edge of the black pixel defining layer 380, so that a portion of the black pixel defining layer 380 may be exposed by the spacer 385. On some portions of the layer 380, second parts 385-2 but not the first parts 385-1 of the spacer 385 may be positioned.

The functional layer FL is disposed on the light emitting layer EML, the spacer 385, and the exposed black pixel defining layer 380. The functional layer FL may overlap an entire face of the substrate 110 of the light emitting display panel DP. The functional layer FL may include an electron injection layer, an electron transport layer, a hole transport layer, and a hole injection layer. Layers of the functional layer FL may be disposed above and below the light emitting layer EML. The hole injection layer, the hole transport layer, the light emitting layer EML, the electron transport layer, the electron injection layer, and the cathode (Cathode) are sequentially disposed on the anode (Anode), so that the hole injection layer and the hole transport layer of the functional layer FL may be disposed at an upper portion of the light emitting layer EML, and the electron transport layer and the electron injection layer thereof may be disposed at a lower portion of the light emitting layer EML.

The cathode (Cathode) may be/include a light transmissive electrode and/or a reflective electrode. The cathode may be a transparent or semi-transparent electrode, and may be formed of a metal thin film that includes at least one of lithium (Li), calcium (Ca), lithium fluoride/calcium (LiF/Ca), lithium fluoride/aluminum (LiF/Al), aluminum (Al), silver (Ag), and magnesium (Mg), and has a small work function. A transparent conductive oxide (TCO) such as an indium tin oxide (ITO), an indium zinc oxide (IZO), a zinc oxide (ZnO), or an indium oxide ($In_2O_3$) may be further disposed on the metal thin film. The cathode may overlap an entire face of the substrate 110 of the light emitting display panel DP.

An encapsulation layer 400 is disposed on the cathode (Cathode). The encapsulation layer 400 includes at least one inorganic layer and at least one organic layer. The encapsulation layer 400 may include a first inorganic encapsulation layer 401, an organic encapsulation layer 402, and a second inorganic encapsulation layer 403 overlapping each other. The encapsulation layer 400 may be for protecting the light emitting layer EML (made of an organic material) from moisture or oxygen that may be introduced from the outside. The encapsulation layer 400 may include inorganic layers and organic layers that are alternately stacked.

The sensing insulating layers 501, 510, and 511 and a plurality of sensing electrodes 540 and 541 are disposed on the encapsulation layer 400 for touch sensing. A touch may be sensed using a capacitive method with two sensing electrodes 540 and 541. A touch may be sensed using a self-cap method with only one sensing electrode. The sensing electrodes 540 and 541 may be insulated from each other by the sensing insulating layers 501, 510, and 511 and may be electrically connected to other conductors through contact holes that extend through one or more of the sensing insulating layers 501, 510, and 511. The sensing electrodes 540 and 541 may include a metal such as aluminum (Al), copper (Cu), silver (Ag), gold (Au), molybdenum (Mo), titanium (Ti), or tantalum (Ta) or a metal alloy of some of the above metals, and may have a single layer or multilayer structure. The lower sensing insulating layer 501 is disposed under the lower sensing electrode 541, the intermediate sensing insulating layer 510 is disposed between the lower sensing electrode 541 and the upper sensing electrode 540, and the upper sensing insulating layer 511 is disposed between the upper sensing electrode 540 and the light blocking layer 220. The upper sensing insulating layer 511 may also be disposed under the color filters 230R, 230G, and 230B. The sensing electrodes 540 and 541 may at least partially cover the anode-connecting opening OP4.

The light blocking layer 220 and the color filters 230R, 230G, and 230B are disposed on the upper sensing electrode 540.

The light blocking layer 220 may overlap the sensing electrodes 540 and 541. A blocking layer opening OPBM may overlap with a corresponding opening OP of the black pixel defining layer 380 in a plan view of the display panel DP. The opening OPBM of the light blocking layer 220 may be wider than the opening OP of the black pixel defining layer 380. As a result, a portion of the anode (Anode) exposed by the opening OP of the black pixel defining layer 380 may not be covered by the light blocking layer 220. The exposed portion of the anode (Anode) and the light emitting layer EML may not be covered by the light blocking layer 220 and the sensing electrodes 540 and 541. The light blocking layer 220 may cover the anode-connecting opening OP4 and the second lower organic layer opening OP3C, but may not cover the first lower organic layer opening OP3U.

The color filters 230R, 230G, and 230B are disposed on the sensing insulating layers 501, 510, and 511 and the light blocking layer 220. The color filters 230R, 230G, and 230B include a red color filter 23R that transmits red light, a green color filter 230G that transmits green light, and a blue color filter 230B that transmits blue light. Each of the color filters 230R, 230G, and 230B may overlap the anode (Anode) of a corresponding light emitting diode. Since light emitted from the light emitting layer EML may be changed by a color filter, the light emitted from different light emitting layers EML may have the same color. The light emitted by different light emitting layers EML may have different colors, and the different colors may be respectively enhanced by color filters of the different colors.

One of the color filters 230R, 230G, and 230B may substantially cover the light blocking layer 220. The overlapping part 230R-1 of the red color filter is disposed on the light blocking layer 220. Main parts 230R-m of the red color filter are disposed in the corresponding openings OPBM of the light blocking layer 220. The overlapping part 230R-1 may connect main parts 230R-m to each other.

Figure 8:
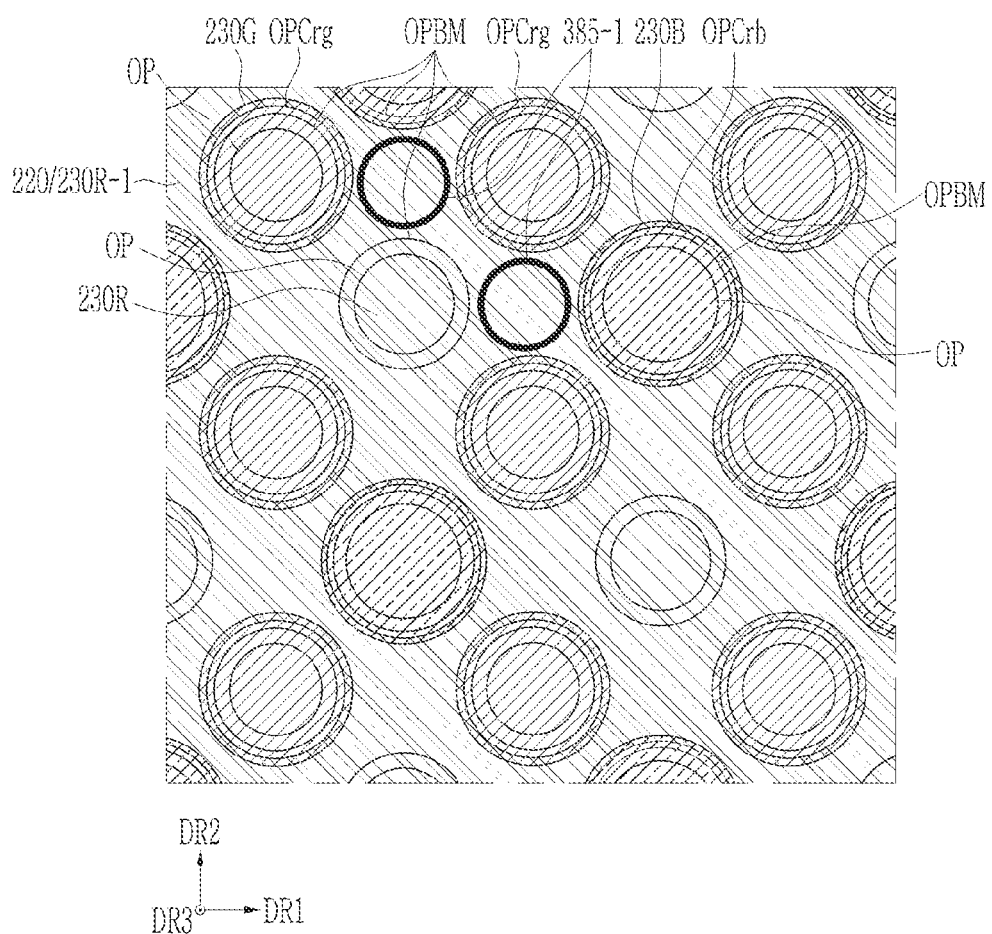
FIG. 8 illustrates a top plan view of a portion of an upper panel layer of a light emitting display device according to an embodiment.
Figure 9:
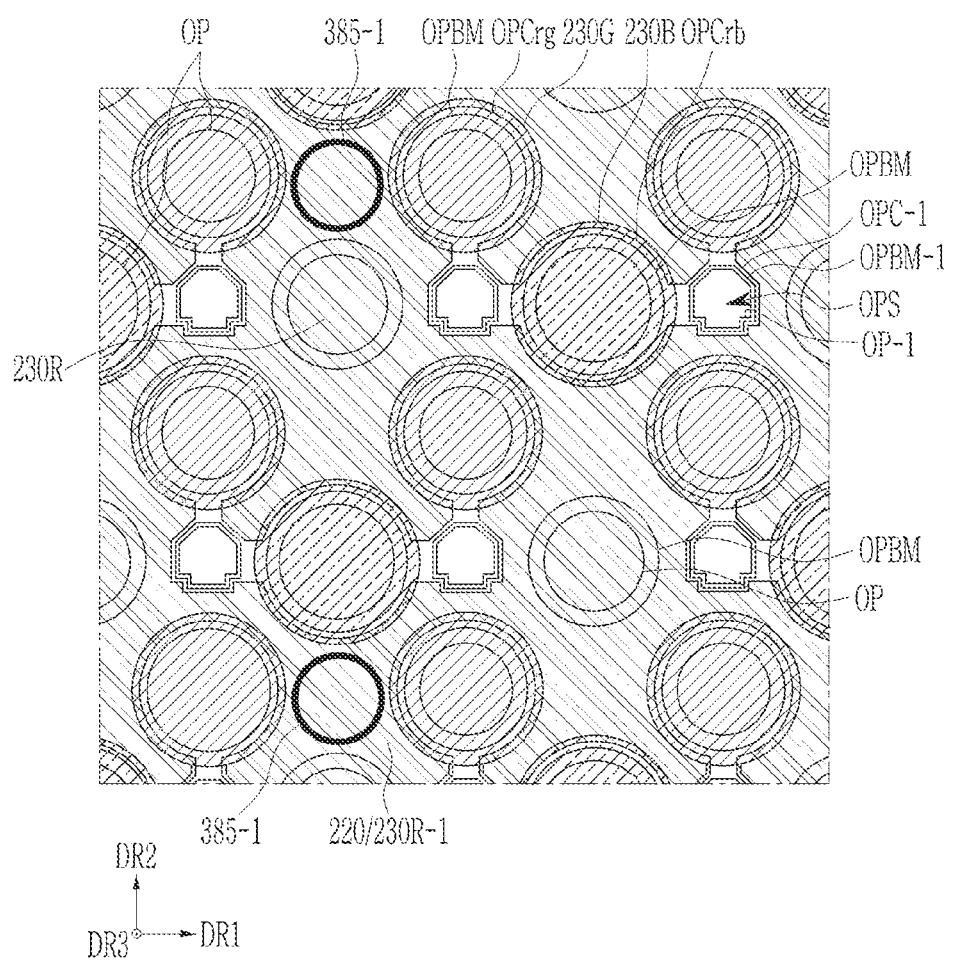
FIG. 9 illustrates a top plan view of a portion of an upper panel layer of a light emitting display device according to an embodiment.

The red color filter 230R has the color filter openings OPCrg and OPCrb (see FIG. 8 and FIG. 9). The color filters 230G and 230B are disposed in the corresponding openings OPBM of the light blocking layer 220 and the corresponding openings OPCrg and OPCrb (see FIG. 8 and FIG. 9) of the red color filter 230R.

The color filters 230R, 230G, and 230B may be replaced with or overlapped by one or more color conversion layers. The color conversion layer(s) may include quantum dots.

The planarization layer 550 is disposed on the color filters 230R, 230G, and 230B. The planarization layer 550 is for planarizing the upper surface of the light emitting display device, and may be a transparent organic insulating layer including at least one of polyimide, polyamide, an acryl resin, benzocyclobutene, and a phenol resin.

A low refractive layer and an additional planarization layer may be further may be disposed on the planarization layer 550 in order to improve front visibility and light emission efficiency of the display device. Light may be refracted to the front side by the low refractive layer and the additional planarization layer having a high refractive characteristic. The low refractive layer and the additional planarization layer may be directly disposed on the color filter 230; the planarization layer 550 may be optional.

No polarizer is formed on the planarization layer 550 for mitigating reflected external light. The black pixel defining layer 380 covers a lateral surface of the anode (Anode) to reduce reflection of light from the anode (Anode), and the light blocking layer 220 also substantially blocks reflected light. Advantageously, it is not necessary to form a polarizer on the front surface of the light emitting display panel DP.

The portion of the anode (Anode) exposed by the opening OP of the black pixel defining layer 380 is formed flat, so that light is not asymmetrically reflected from the anode (Anode). The part of the anode (Anode) in the anode-connecting opening OP 4 is not flat but is covered by the black pixel defining layer 380 and the light blocking layer 220, so that asymmetrically reflected light is substantially blocked.

The light emitting display panel DP may include a lower panel layer and an upper panel layer. The lower panel layer may include the light emitting diode, the pixel circuit part, and may the encapsulation layer 400. The lower panel layer includes the anode (Anode), the black pixel defining layer 380, the light emitting layer EML, the spacer 385, the functional layer FL, the cathode (Cathode) between the substrate 110 and the encapsulation layer 40, an insulating layer, a semiconductor layer, and a conductive layer between the substrate 110 and the anode (Anode). The upper panel layer is disposed on the encapsulation layer 400 and includes the sensing insulating layers 501, 510, and 511, the sensing electrodes 540 and 541, the light blocking layer 220, the color filters 230R, 230G, and 230B, and the planarization layer 550.

Figure 7:
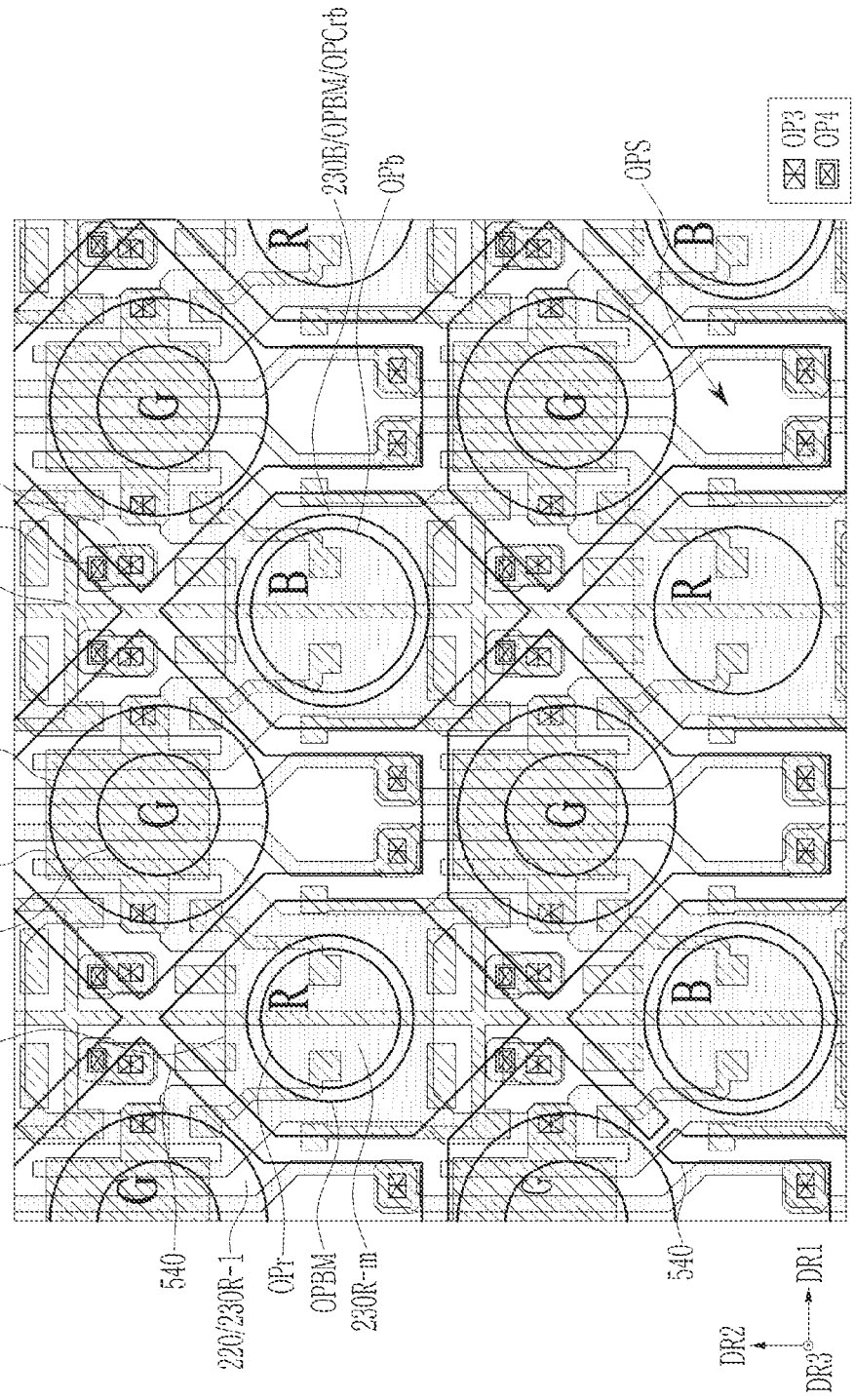
FIG. 7 illustrates a top plan view of a portion of a lower panel layer of a light emitting display device according to an embodiment.

FIG. 7 illustrates a top plan view of a portion of a lower panel layer of a light emitting display device according to an embodiment. Relations between the openings OP3 and OP4, the light blocking layer 220, the sensing electrode 540, and the color filters 230R, 230G, and 230B in the display panel DP are described with reference to FIG. 7, etc.

Referring to FIG. 6 and FIG. 7, the light blocking layer 220 substantially covers/overlaps the substrate 110 except for at the color filter openings OPBM (or blocking layer openings OPBM).

The red color filter 230R substantially covers/overlaps the substrate 110 except for the color filter openings OPCrg and OPCrb. The red color filter 230R may have the overlapping part 230R-1 that connects main parts 230R-m to each other and overlaps the light blocking layer 220.

Two color filters 230G and 230B of different colors are formed in the color filter openings OPCrg and OPCrb of the red color filter 230R and the corresponding openings OPBM of the light blocking layer 220.

In FIG. 7, boundaries between the color filter openings OPCrg and OPCrb, the opening OPBM of the light blocking layer 220, and the two color filters 230G and 230B are shown by a single line. In reality, as shown in FIG. 8 and FIG. 9, they may have different boundaries.

The sensing electrode 540 includes an oblique portion extending oblique relative to the first direction DR1 and the second direction DR2, and includes a connecting portion having a U-shaped structure partially surrounding the second element area OPS. The connecting portion connects oblique portions. The connecting portion may prevent the second element area OPS from overlapping with the sensing electrode in a plan view of the display panel DP. A touch may be sensed by a change in capacitance between two sensing electrodes 540 that are spaced from each other.

In the lower panel layer, the black pixel defining layer 380 substantially covers/overlaps the substrate 110 except for the openings OPr, OPg, and OPb for exposing the corresponding anodes. The openings OPr, OPg, and OPb are positioned in the corresponding openings OPBM of the light blocking layer 220 in a plan view of the display panel DP. The openings OPr, OPg, and OPb are smaller than the openings OPBM and overlap with the openings OPBM in a plan view of the display panel DP.

In FIG. 7, the anode-connecting opening OP4 in the second organic layer 182 and the third organic layer 183 and the lower organic layer opening OP3 in the first organic layer 181 have different shapes.

Figure 23:
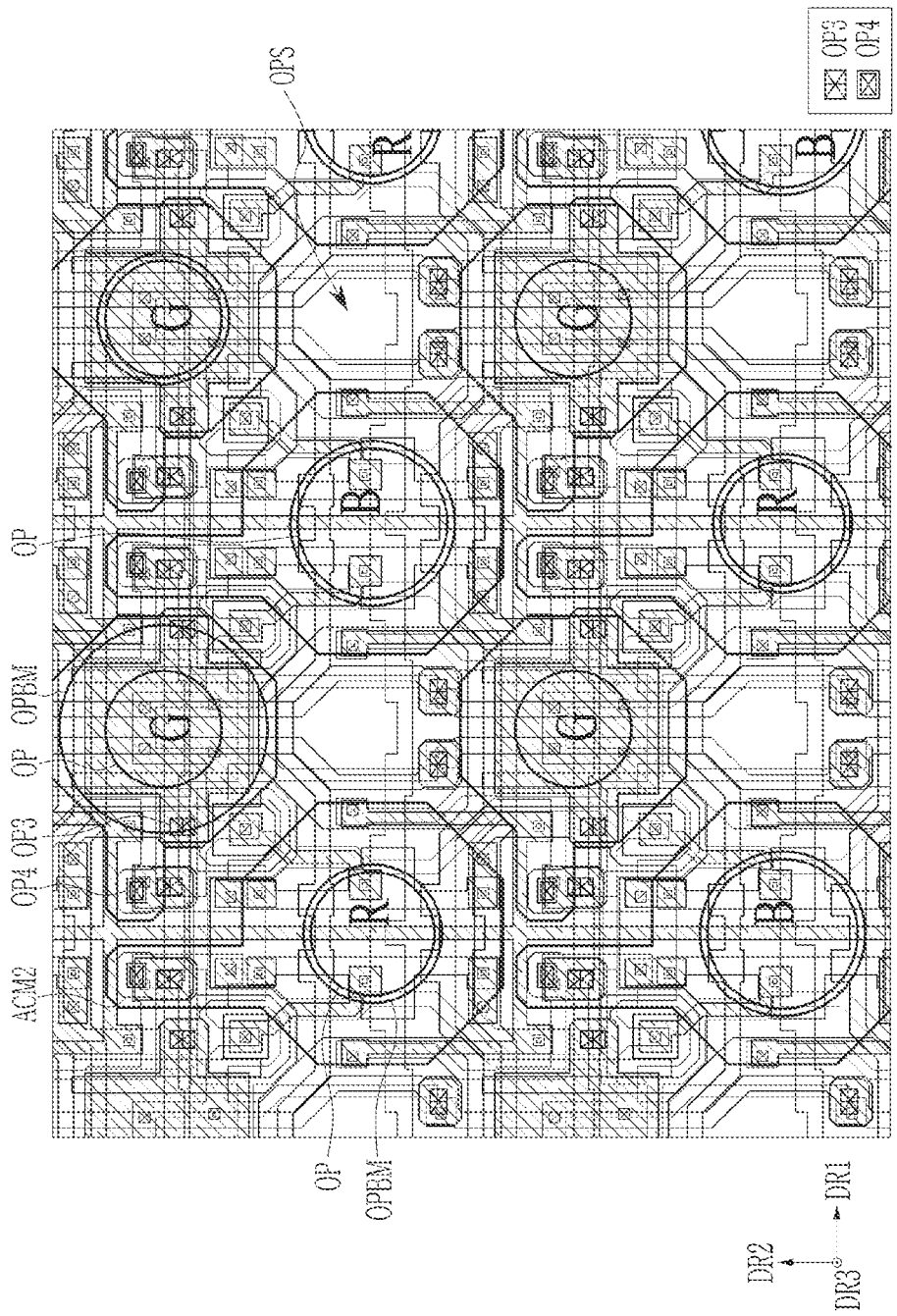

Referring to FIG. 23, the black pixel defining layer 380 has the opening OP for exposing the anode (Anode), and the anode (Anode) extends to the anode-connecting opening OP4. A portion of the anode (Anode) extends toward the anode-connecting opening OP4 is covered by the black pixel defining layer 380. The anode-connecting opening OP4 disposed in the second organic layer 182 and the third organic layer 183 is covered by the black pixel defining layer 380. The anode-connecting opening OP4 overlaps with the light blocking layer 220 in a plan view of the display panel DP.

Referring to FIG. 7, the anode-connecting opening OP4 may overlap with the oblique portion of the sensing electrode 540 in a plan view of the display panel DP. All of the anode-connecting openings OP4 may overlap with the sensing electrode 540 in a plan view of the display panel DP.

Some of the lower organic layer openings OP3 may be covered by the black pixel defining layer 380. The lower organic layer openings OP3 disposed at opposite sides of the green anode exposure opening OPg of the black pixel defining layer 380 may overlap with the opening OPBM of the light blocking layer 220, may correspond to the first lower organic layer opening OP3U of FIG. 6, and may not be covered by the light blocking layer 220. The first lower organic layer opening OP3U may overlap with the green color filter 230G in a plan view of the display panel DP, and may overlap with the black pixel defining layer 380 in a plan view of the display panel DP. A lower organic layer opening OP3 may correspond to the second lower organic layer opening OP3C and may be covered by the light blocking layer 220 and the black pixel defining layer 380.

A portion of the second lower organic layer opening OP3C may overlap with the anode connecting part ACM2 and may overlap with the sensing electrode 540 in a plan view of the display panel DP. A lower organic layer opening OP3 may not overlap with the sensing electrode 540 in a plan view of the display panel DP.

Referring to FIG. 7, a portion of the lower organic layer opening OP3 may overlap with an oblique portion of the sensing electrode 540 in a plan view of the display panel DP. Some of the lower organic layer openings OP3 may not overlap with the sensing electrode 540 in a plan view of the display panel DP.

The first data conductive layer and the second data conductive layer shown in FIG. 7 may have extensions FL-SD1 and FL-SD2 that overlap with the anode (Anode) and/or the openings OPr, OPg, and OPb in a plan view of the display panel DP.

Under the red and blue openings OPr and OPb, the extension FL-SD2 may be present. The extension FL-SD2 of the second data conductive layer may overlap with the red and blue openings OPr and OPb in a plan view of the display panel DP. The portions of anodes overlapping with the red and blue openings OPr and OPb may be flattened by the extension FL-SD2 of the second data conductive layer and at least one organic layer 181, 182, or 183.

Figure 20:
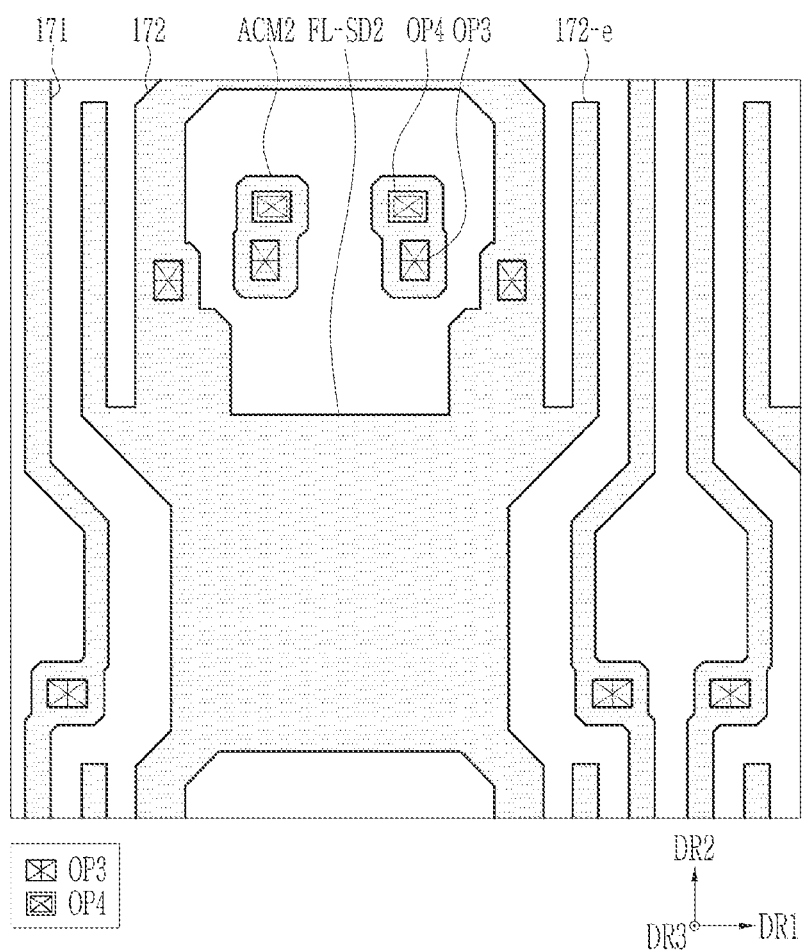

Under the green opening OPg, the extension FL-SD1 of the first data conductive layer may be present. The extension FL-SD1 of the first data conductive layer may overlap the green opening OPg in a plan view of the display panel DP. In FIG. 7, a four wire structure (also referred to as a wire part) disposed on the second data conductive layer may overlap with the extension FL-SD1 of the first data conductive layer and the green opening OPg. Referring to FIG. 20, the wire part of the second data conductive layer may be a portion of a data line 171 for transmitting a data voltage and a driving voltage line 172 for transmitting a driving voltage ELVDD. In the anode (Anode) corresponding to the green opening OPg, since the underlying second data conductive layer does not have a flat extension structure, the flatness of the anode may be insufficient without the organic layers 182 and 183. The organic layers 182 and 183 may improve the flatness, and four wire parts are disposed on the second data conductive layer to prevent a potential step in the anode. Considering the actual line width of one wire, the size of the green opening OPg formed in the black pixel defining layer 380, and the degree of planarization by the organic layers 182 and 183, as shown in FIG. 6, when four wire parts are formed in the second data conductive layer to overlap the green opening OPg, the anode may be sufficiently flat. The anode overlapping the green opening OPg may be planarized by the extension FL-SD1 of the first data conductive layer, the wire part of the second data conductive layer, and at least one organic layer 181, 182, or 183.

Structural relations of the black pixel defining layer 380, the light blocking layer 220, the color filter 230, and the first part 385-1 of the spacer are described with reference to FIG. 8 and FIG. 9.

FIG. 8 illustrates a top plan view of a portion of an upper panel layer of a light emitting display device according to an embodiment.

Referring to FIG. 6, FIG. 8, etc., the light blocking layer 220 includes the opening OPBM. The opening OPBM may overlap with a corresponding opening OP (of the black pixel defining layer 380) and may be wider than the corresponding opening OP in a plan view of the display panel DP. In FIG. 8, the opening OP of the black pixel defining layer 380 and the first part 385-1 of the spacer 385 are shown in order to clearly show the relationship between the upper panel layer and the lower panel layer.

The color filters 230R, 230G, and 230B are disposed on the light blocking layer 220. One of the color filters 230R, 230G, and 230B may have openings and may be substantially cover a face of the substrate 110; the other two may fill the openings. Referring to FIG. 8, the red color filter 230R has the openings OPCrg and OPCrb, and the green and blue color filters 230G and 230B fill the openings OPCrg and OPCrb. In FIG. 8, different color filters are illustrated with different hatching, so that they may be easily distinguished.

The red color filter 230R overlaps the light blocking layer 220, the main parts 230R-m of the red color filter 230R fill the openings OPBM for the red pixels. The red color filter 230R further includes the overlapping part 230R-1 overlapping the light blocking layer 220. The openings OPCrg and the openings OPCrb overlap with the openings OPBM for the green pixels and the openings OPBM for the blue pixels, respectively. Each of the openings OPCrg and OPCrb of the red color filter 230R is wider than each opening OPBM of the light blocking layer 220.

The green color filter 230G may or may not extend beyond the opening OPBM and the opening OPCrg in the directions DR1 and DR2.

The blue color filter 230B may or may not extend beyond the opening OPBM for the blue pixel and the opening OPCrb in the directions DR1 and DR2.

Referring to FIG. 8, the position of the first part 385-1 of the spacer 385 may overlap with the light blocking layer 220 and the overlapping part 230R-1 of the red color filter 230R in a plan view of the display panel DP. Referring to FIG. 6, the first portion 385-1 of the spacer 385 is formed on the black pixel defining layer 380 in the third direction DR3 and is disposed under the light blocking layer 220 and/or the overlapping part 230R-1 of the red color filter 230R in the third direction DR3.

The structure of the upper panel layer as shown in FIG. 8 may be positioned at an upper portion of the normal pixel.

Structures of the upper panel layer in the second element area OPS of the first display area DA1 are described with reference to FIG. 9.

FIG. 9 illustrates a top plan view of a portion of an upper panel layer of a light emitting display device according to an embodiment.

In FIG. 9, the opening OP of the black pixel defining layer 380 disposed on the lower panel layer and the first part 385-1 of the spacer 385 are shown in order to clearly show the relationship between the upper panel layer and the lower panel layer.

Figure 24:
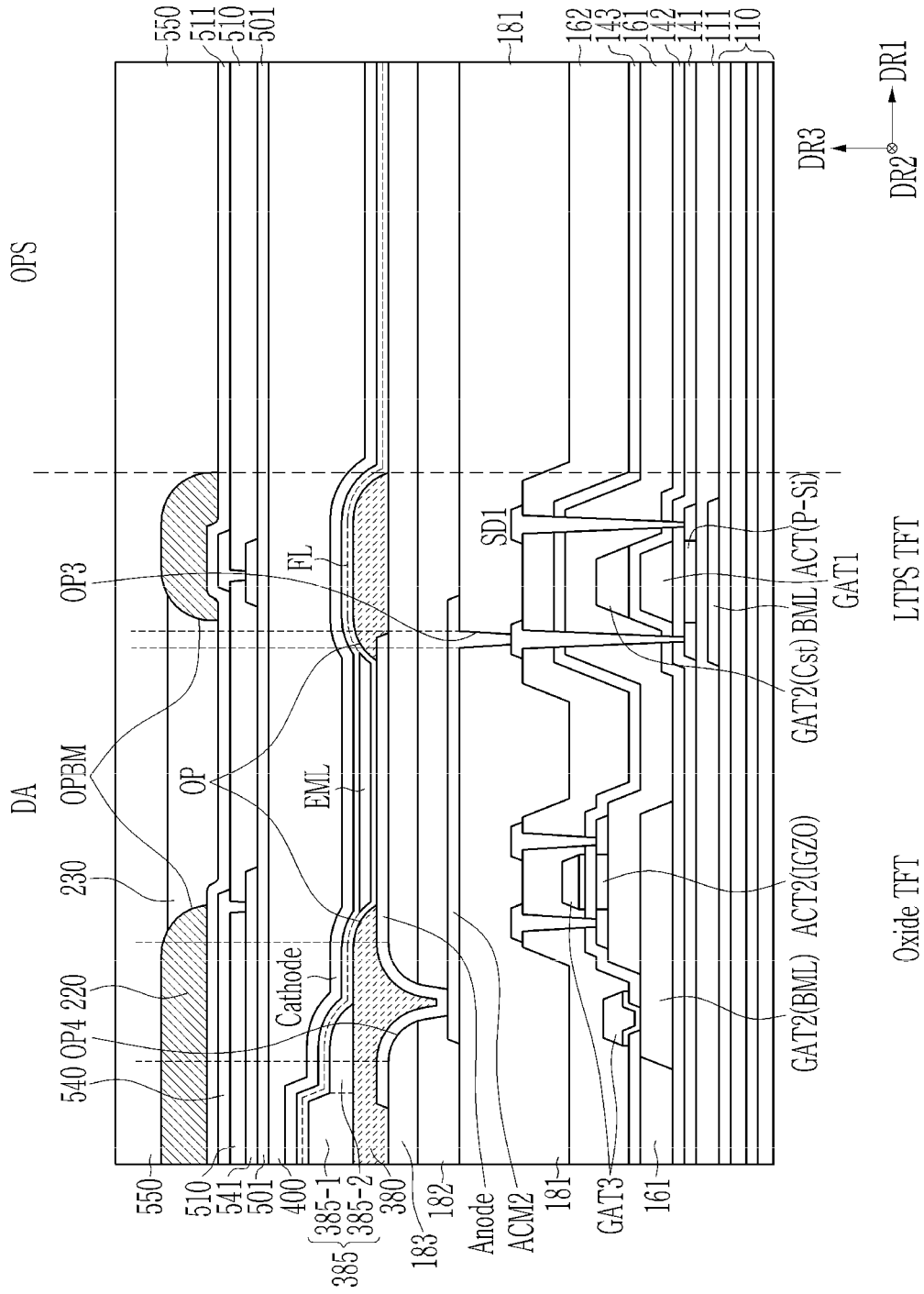
FIG. 24 illustrates a cross-sectional view of a light emitting display device according to an embodiment.

Referring to FIG. 9 and FIG. 24, an additional opening OP-1 (or light transmitting opening OP-1) is formed in the black pixel defining layer 380 to correspond to the second element area OPS, an additional opening OPBM-1 (or light transmitting opening OPBM-1) is formed in the light blocking layer 220, and an additional opening OPC-1 (or light transmitting opening OPC-1) is formed in the red color filter 230R. The additional opening OPC-1 formed in the red color filter 230R extends from/to the opening OPCrg for the green pixel and from/to the opening OPCrb for the blue pixel. In the red color filter 230R, the opening OPCrg for the green pixel, the opening OPCrb for the blue pixel, and the additional opening OPC-1 may be formed as one opening or separate openings.

Due to the additional opening OPBM-1 of the light blocking layer 220 and the additional opening OPC-1 of the red color filter 230R, the upper panel layer does not block light in the second element area OPS. Referring to FIG. 23, even in the lower panel layer, no conductive layer or no semiconductor layer is disposed in the second element area OPS. An optical sensor (e.g., an infrared sensor) disposed on the rear surface of the light emitting display panel DP may sense light transmitted through the second element area OPS.

Referring to FIG. 9, the first part 385-1 of the spacer 385 may overlap with the light blocking layer 220 and the overlapping part 230R-1 of the red color filter 230R in a plan view of the display panel DP, and may not overlap the second element area OPS. The first portion 385-1 of the spacer 385 is formed on the black pixel defining layer 380 in the third direction DR3 and is disposed under the light blocking layer 220 and/or the overlapping part 230R-1 of the red color filter 230R in the third direction DR3.

Figure 10:
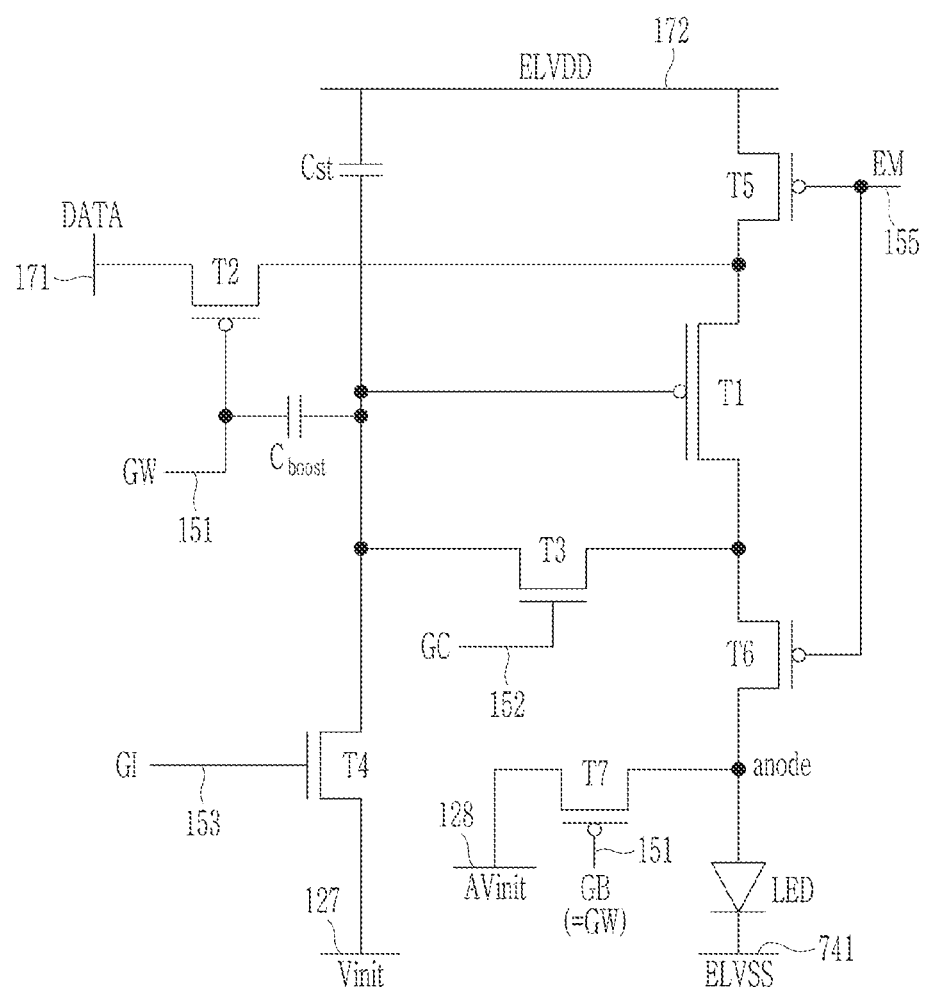
FIG. 10 illustrates a circuit diagram of one pixel included in a light emitting display device according to an embodiment.

FIG. 10 illustrates a circuit diagram of a pixel included in a light emitting display device according to an embodiment.

The circuit structure shown in FIG. 10 is applicable to a pixel in the first display area DA1 and is applicable to a pixel in the first element area DA2 (including the second element area OPS).

The pixel includes transistors T1, T2, T3, T4, T5, T6, and T7, a storage capacitor Cst, a boost capacitor $C_{boost}$, and a light emitting diode LED, connected to a plurality of wires 127, 128, 151, 152, 153, 155, 171, 172, and 741. The transistors and the capacitors excluding the light emitting diode LED form a pixel circuit part. The boost capacitor $C_{boost}$ may be omitted.

The plurality of wires 127, 128, 151, 152, 153, 155, 171, 172, and 741 are connected to one pixel PX. The plurality of wires include a first initialization voltage line 127, a second initialization voltage line 128, a first scan line 151, a second scan line 152, an initialization control line 153, an emission control line 155, a data line 171, a driving voltage line 172, and a common voltage line 741. The first scan line 151 connected to the seventh transistor T7 is also connected to the second transistor T2, but The seventh transistor T7, unlike the second transistor T2, may be connected to a bypass control line.

The first scan line 151 is connected to a scan driver (not shown) to transmit a first scan signal GW to the second transistor T2 and the seventh transistor T7. The second scan line 152 may be applied with a voltage of an opposite polarity to a voltage applied to the first scan line 151 at the same timing as that of a signal of the first scan line 151. For example, when a negative voltage is applied to the first scan line 151, a positive voltage may be applied to the second scan line 152. The second scan line 152 transmits a second scan signal GC to the third transistor T3. The initialization control line 153 transmits an initialization control signal GI to the fourth transistor T4. The emission control line 155 transmits an emission control signal EM to the fifth transistor T3 and the sixth transistor T6.

The data line 171 is a line that transmits a data voltage DATA generated by a data driver (not shown), and thus, as an amount of an emission current transmitted to the light emitting diode LED is changed, and luminance emitted by the light emitting diode LED is also changed. The driving voltage line 172 applies a driving voltage ELVDD. The first initialization voltage line 127 transmits a first initialization voltage Vinit, and the second initialization voltage line 128 transmits a second initialization voltage AVinit. The common voltage line 741 applies a common voltage ELVSS to a cathode of the light emitting diode LED. In the present embodiment, each of voltages applied to the driving voltage line 172, the first and second initialization voltage lines 127 and 128, and the common voltage line 741 may be a constant voltage.

The driving transistor T1 (also referred to as the first transistor) is a p-type transistor, and has a silicon semiconductor as a semiconductor layer. It is a transistor that adjusts the amount of the emission current outputted to the anode of the light emitting diode LED according to a voltage (that is, a voltage stored in the storage capacitor Cst) of a gate electrode of the driving transistor T1. Since brightness of the light emitting diode LED is adjusted according to the amount of the emission current outputted to the anode electrode of the light emitting diode LED, light emission luminance of the light emitting diode LED may be adjusted according to the data voltage DATA applied to the pixel. For this purpose, a first electrode of the driving transistor T1 is disposed to receive the driving voltage ELVDD, and is connected to the driving voltage line 172 via the fifth transistor T5. The first electrode of the driving transistor T1 is connected to a second electrode of the second transistor T2 to receive the data voltage DATA. A second electrode of the driving transistor T1 outputs the emission current to the light emitting diode LED, and is connected to the anode of the light emitting device LED via the sixth transistor T6 (hereinafter referred to as an output control transistor). The second electrode of the driving transistor T1 is also connected to the third transistor T3 to transmit the data voltage DATA applied to the first electrode thereof to the third transistor T3. A gate electrode of the driving transistor T1 is connected to one electrode of the storage capacitor Cst (hereinafter referred to as a 'second storage electrode'). Accordingly, a voltage of the gate electrode of the driving transistor T1 is changed according to a voltage stored in the storage capacitor Cst, and accordingly, an emission current outputted from the driving transistor T1 is changed. The storage capacitor Cst serves to maintain the voltage of the gate electrode of the driving transistor T1 constant for one frame. The gate electrode of the driving transistor T1 may also be connected to the third transistor T3 so that the data voltage DATA applied to the first electrode of the driving transistor T1 passes through the third transistor T3 to be transmitted to the gate electrode of the driving transistor T1. The gate electrode of the driving transistor T1 may also be connected to the fourth transistor T4 to be initialized by receiving the first initialization voltage Vinit.

The second transistor T2 is a p-type transistor, and has a silicon semiconductor as a semiconductor layer. The second transistor T2 is a transistor that allows the data voltage DATA to be received into the pixel. A gate electrode of the second transistor T2 is connected to the first scan line 151 and one electrode of the boost capacitor $C_{boost}$ (hereinafter referred to as a 'lower boost electrode'). A first electrode of the second transistor T2 is connected to the data line 171. A second electrode of the second transistor T2 is connected to the first electrode of the driving transistor T1. When the second transistor T2 is turned on by a negative voltage of the first scan signal GW transmitted through the first scan line 151, the data voltage DATA transmitted through the data line 171 is transmitted to the first electrode of the driving transistor T1, and finally, the data voltage DATA is transmitted to the gate electrode of the driving transistor T1 to be stored in the storage capacitor Cst.

The third transistor T3 is an n-type transistor, and has an oxide semiconductor as a semiconductor layer. The third transistor T3 electrically connects the second electrode of the driving transistor T1 and the gate electrode of the driving transistor T1. As a result, it is a transistor that allows the data voltage DATA to be compensated by a threshold voltage of the driving transistor T1 and then stored in the second storage electrode of the storage capacitor Cst. A gate electrode of the third transistor 13 is connected to the second scan line 152, and a first electrode of the third transistor T3 is connected to the second electrode of the driving transistor T1. A second electrode of the third transistor T3 is connected to the second storage electrode of the storage capacitor Cst, the gate electrode of the driving transistor T1, and the other electrode of the boost capacitor $C_{boost}$ (hereinafter referred to as an 'upper boost electrode'). The third transistor T3 is turned on by a positive voltage of the second scan signal GC transmitted through the second scan line 152 to connect the gate electrode of the driving transistor T1 and the second electrode of the driving transistor T1, and to allow a voltage applied to the gate electrode of the driving transistor T1 to be transmitted to the second storage electrode of the storage capacitor Cst to be stored in the storage capacitor Cst. The voltage stored in the storage capacitor Cst is at the level of the voltage of the gate electrode of the driving transistor T1 when the driving transistor T1 is turned off, and a threshold voltage (Vth) of the driving transistor T1 is compensated.

The fourth transistor T4 is an n-type transistor, and has an oxide semiconductor as a semiconductor layer. The fourth transistor T4 serves to initialize the gate electrode of the driving transistor T1 and the second storage electrode of the storage capacitor Cst. A gate electrode of the fourth transistor T4 is connected to the initialization control line 153, and a first electrode of the fourth transistor T4 is connected to the first initialization voltage line 127. A second electrode of the fourth transistor T4 is connected to the second electrode of the third transistor T3, the second storage electrode of the storage capacitor Cst, the gate electrode of the driving transistor T1, and the upper boost electrode of the boost capacitor $C_{boost}$. The fourth transistor T4 is turned on by a positive voltage of the initialization control signal GI received through the initialization control line 153, and at this time, it transmits the first initialization voltage Vinit to the gate electrode of the driving transistor T1, the second storage electrode of the storage capacitor Cst, and the upper boost electrode of the boost capacitor $C_{boost}$ to initialize them.

The fifth transistor T5 and the sixth transistor T6 are p-type transistors, and have silicon semiconductors as a semiconductor layer.

The fifth transistor T5 serves to transmit the driving voltage ELVDD to the driving transistor T1. A gate electrode of the fifth transistor T5 is connected to the light emission control line 155, a first electrode of the fifth transistor T5 is connected to the driving voltage line 172, and a second electrode of the fifth transistor T5 is connected to the first electrode of the driving transistor T1.

The sixth transistor T6 serves to transmit an emission current outputted from the driving transistor T1 to the light emitting diode LED. A gate electrode of the sixth transistor T6 is connected to the light emission control line 155, a first electrode of the sixth transistor T6 is connected to the second electrode of the driving transistor T1, and a second electrode of the sixth transistor T6 is connected to the anode of the light emitting diode LED.

The seventh transistor T7 is a p-type or n-type transistor, and has a silicon semiconductor or an oxide semiconductor as a semiconductor layer. The seventh transistor T7 serves to initialize the anode of the light emitting diode LED. A gate electrode of the seventh transistor T7 is connected to the first scan line 151, a first electrode of the seventh transistor T7 is connected to the anode of the light emitting diode LED, and a second electrode of the seventh transistor T7 is connected to the second initialization voltage line 128. When the seventh transistor T7 is turned on by a negative voltage of the first scan line 151, the second initialization voltage AVint is applied to the anode of the light emitting diode LED to initialize it. The gate electrode of the seventh transistor T7 may be connected to a separate bypass control line, and may separately control it from the first scan line 151. In The second initialization voltage line 128 to which the second initialization voltage AVinit is applied may be the same as the first initialization voltage line 127 to which the first initialization voltage Vinit is applied.

It is described that one pixel PX includes the seven transistors T1 to T7 and two capacitors (the storage capacitor Cst and the boost capacitor $C_{boost}$), and The boost capacitor $C_{boost}$ may be removed. In addition, although the third transistor and the fourth transistor are formed as n-type transistors, only one of them may be formed as an n-type transistor or the other thereof may be formed as an n-type transistor.

FIG. 11, FIG. 12, FIG. 13, FIG. 14, FIG. 15, FIG. 16, FIG. 17, FIG. 18, FIG. 19, FIG. 20, FIG. 21, FIG. 22, and FIG. 23 illustrate structures of layers formed in a manufacturing process of a lower panel layer of a light emitting display device according to an embodiment.

Figure 11:
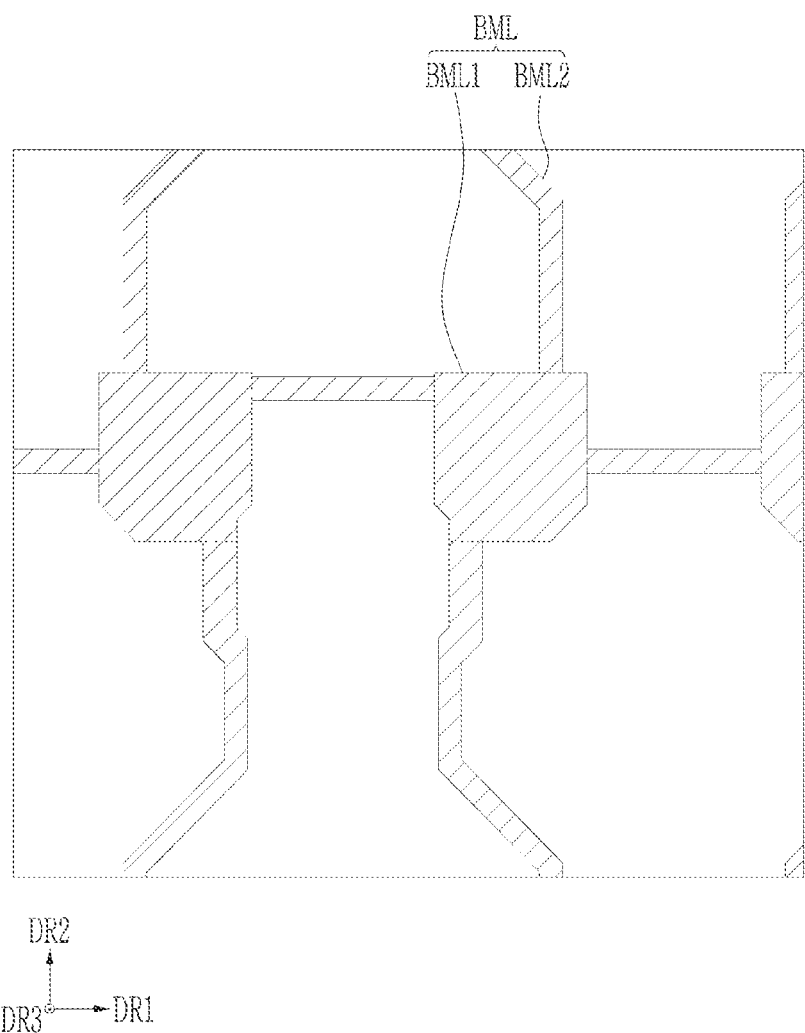
FIG. 11, FIG. 12, FIG. 13, FIG. 14, FIG. 15, FIG. 16, FIG. 17, FIG. 18, FIG. 19, FIG. 20, FIG. 21, FIG. 22, and FIG. 23 illustrate structures of layers formed in a manufacturing process of a lower panel layer of a light emitting display device according to an embodiment.

Referring to FIG. 11, FIG. 6, and FIG. 24, a metal layer BML is disposed on the substrate 110.

The substrate 110 may include a rigid material such as glass, may include a flexible material such as plastic or polyimide, and/or may or may not be bent. Referring to FIG. 24, the substrate 100 may include a polyimide layer and a barrier layer (formed of an inorganic insulating material) on the polyimide layer.

The metal layer BML includes extensions BML1 and a connection part BML2 for connecting the extensions BML1 to each other. The extension BML1 of the metal layer BML may overlap with a channel 1132 of a first semiconductor layer of the driving transistor T1 in a plan view of the display panel DP. The metal layer BML is also referred to as a lower shielding layer, and may contain a metal such as copper (Cu), molybdenum (Mo), aluminum (Al), titanium (Ti) or a metal alloy of some of the above metals, may additionally contain amorphous silicon, and may have a single layer or multilayer structure.

Referring to FIG. 24, the buffer layer 111 covers the substrate 110, and the metal layer BML is disposed on the buffer layer 111. The buffer layer 111 serves to block penetration of impurity elements into the first semiconductor layer 130, and may be an inorganic insulating layer including a silicon oxide (SiOx), a silicon nitride (SiNx), or a silicon oxynitride (SiOxNy).

Figure 12:
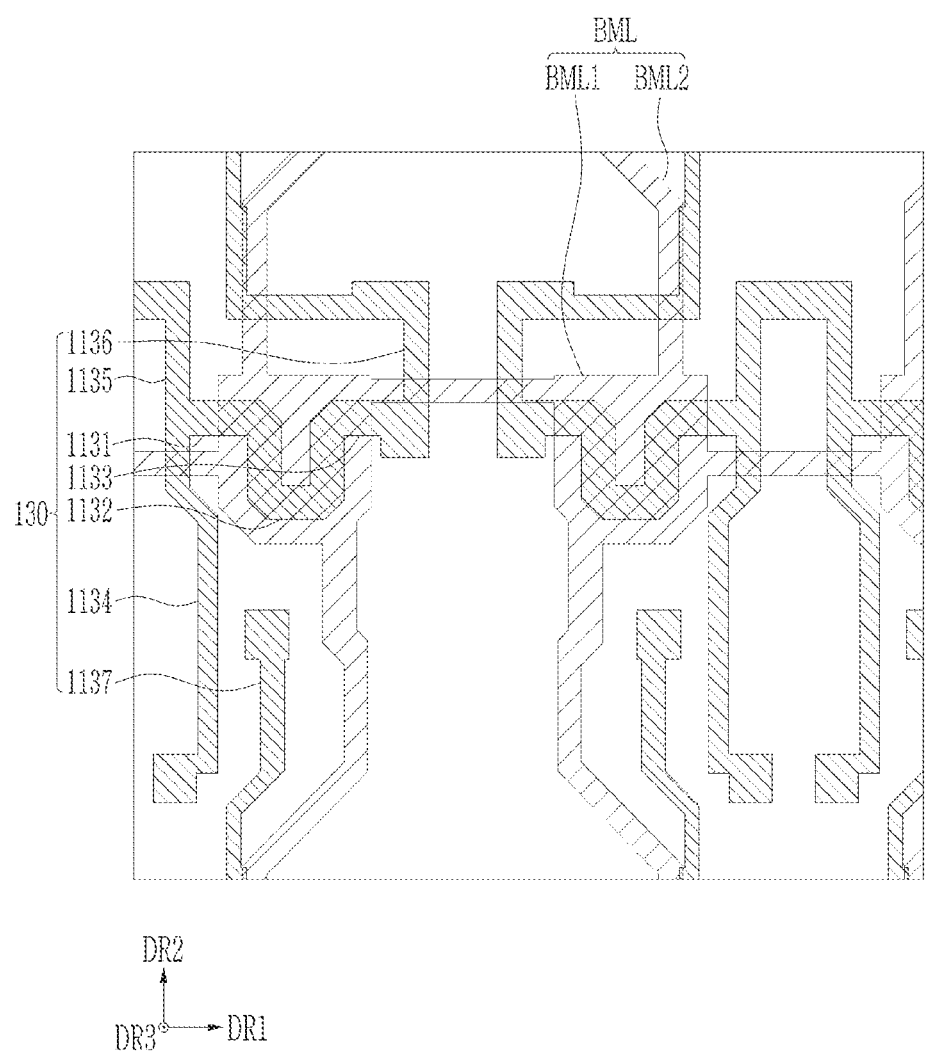

Referring to FIG. 12 and FIG. 24, the first semiconductor layer 130 formed of a silicon semiconductor (for example, a polycrystalline semiconductor) is disposed on the buffer layer 111. The first semiconductor layer 130 includes a channel 1132, a first area 1131, and a second area 1133 of the driving transistor T1. The first semiconductor layer 130 includes not only the channel of the driving transistor T1 but also the channels of the second transistor T2, the fifth transistor T5, the sixth transistor T6, and the seventh transistor T7, and opposite sides of each channel have conductive areas formed by plasma treatment or doping to serve as first and second electrodes.

The channel 1132 of the driving transistor T1 may have a curved shape and/or another shape in a plan view of the display panel DP. The channel 1132 of the driving transistor T1 may include multiple bends or may be formed in a rod shape. The first area 1131 and the second area 1133 of the driving transistor T1 may be disposed at opposite sides of the channel 1132 of the driving transistor T1. The first area 1131 and the second area 1133 serve as the first electrode and the second electrode of the driving transistor T1.

In the first semiconductor layer 130, the channel, the first area, and the second area of the second transistor T2 are disposed in a portion 1134 extending downward from the first area 1131 of the driving transistor T1. The channel, the first area, and the second area of the fifth transistor 12 are disposed in a portion 1135 extending upward from the first area 1131 of the driving transistor T1. The channel, the first area, and the second area of the sixth transistor T6 are disposed in a portion 1136 extending upward from the second area 1133 of the driving transistor T1. The channel, the first area, and the second area of the seventh transistor T7 are disposed in a portion 1137, which is spaced from the portion 1136.

Referring to FIG. 12 and FIG. FIG. 24, a first gate insulating layer 141 may be disposed on the first semiconductor layer 130 including the channel 1132, the first area 1131, and the second area 1133 of the driving transistor T1. The first gate insulating layer 141 may be an inorganic insulating layer including a silicon oxide (SiOx), a silicon nitride (SiNx), or a silicon oxynitride (SiOxNy).

Figure 13:
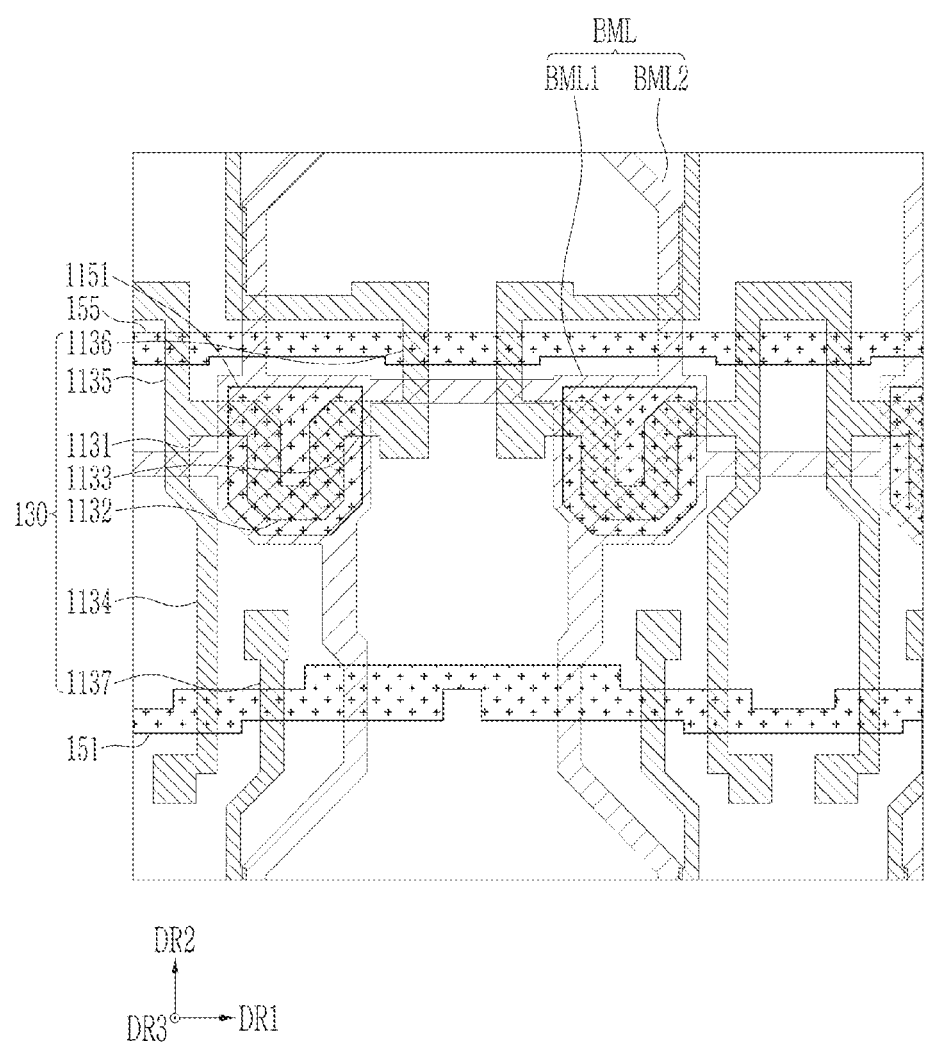

Referring to FIG. 13 and FIG. 24, a first gate conductive layer including a gate electrode 1151 of the driving transistor T1 may be disposed on the first gate insulating layer 141. The first gate conductive layer may include a gate electrode of each of the second transistor T2, the fifth transistor T5, the sixth transistor T6, and the seventh transistor T7, as well as the driving transistor T1. The gate electrode 1151 of the driving transistor T1 may overlap the channel 1132 of the driving transistor T1. The channel 1132 of the driving transistor T1 is covered by the gate electrode 1151 of the driving transistor T1.

The first gate conductive layer may further include the first scan line 151 and the emission control line 155. The first scan line 151 and the emission control line 155 may substantially extend in a horizontal direction (hereinafter also referred to as a first direction). The first scan line 151 may be connected to the gate electrode of the second transistor T2. The first scan line 151 may be integrated with the gate electrode of the second transistor T2. The first scan line 151 is also connected to the gate electrode of the seventh transistor T7 of the rear pixel.

The emission control line 155 may be connected to the gate electrode of the fifth transistor T5 and the gate electrode of the sixth transistor T6, and the emission control line 155 and the gate electrodes of the fifth transistor T and the sixth transistor T6 may be integrally formed.

The first gate conductive layer may include a metal such as copper (Cu), molybdenum (Mo), aluminum (Al), or titanium (T1), or a metal alloy of some of the above metals, and may be formed as a single layer or a multilayer structure.

After the first gate conductive layer including the gate electrode 1151 of the driving transistor T1 is formed, the exposed area of the first semiconductor layer may be conductive by performing a plasma treatment or a doping process. That is, the first semiconductor layer covered by the first gate conductive layer is not conductive, and a portion of the first semiconductor layer that is not covered by the first gate conductive layer may have the same characteristic as the conductive layer. As a result, the transistor including the conductive portion has a p-type transistor characteristic, so that the driving transistor T1, the second transistor T2, the fifth transistor T5, the sixth transistor T6, and the seventh transistor T7 may be p-type or n-type transistors.

Referring to FIG. 24, a second gate insulating layer 142 may be disposed on the first gate conductive layer and the first gate insulating layer 141 including the gate electrode 1151 of the driving transistor T1. The second gate insulating layer 142 may be an inorganic insulating layer including a silicon oxide (SiOx), a silicon nitride (SiNx), or a silicon oxynitride (SiOxNy).

Figure 14:
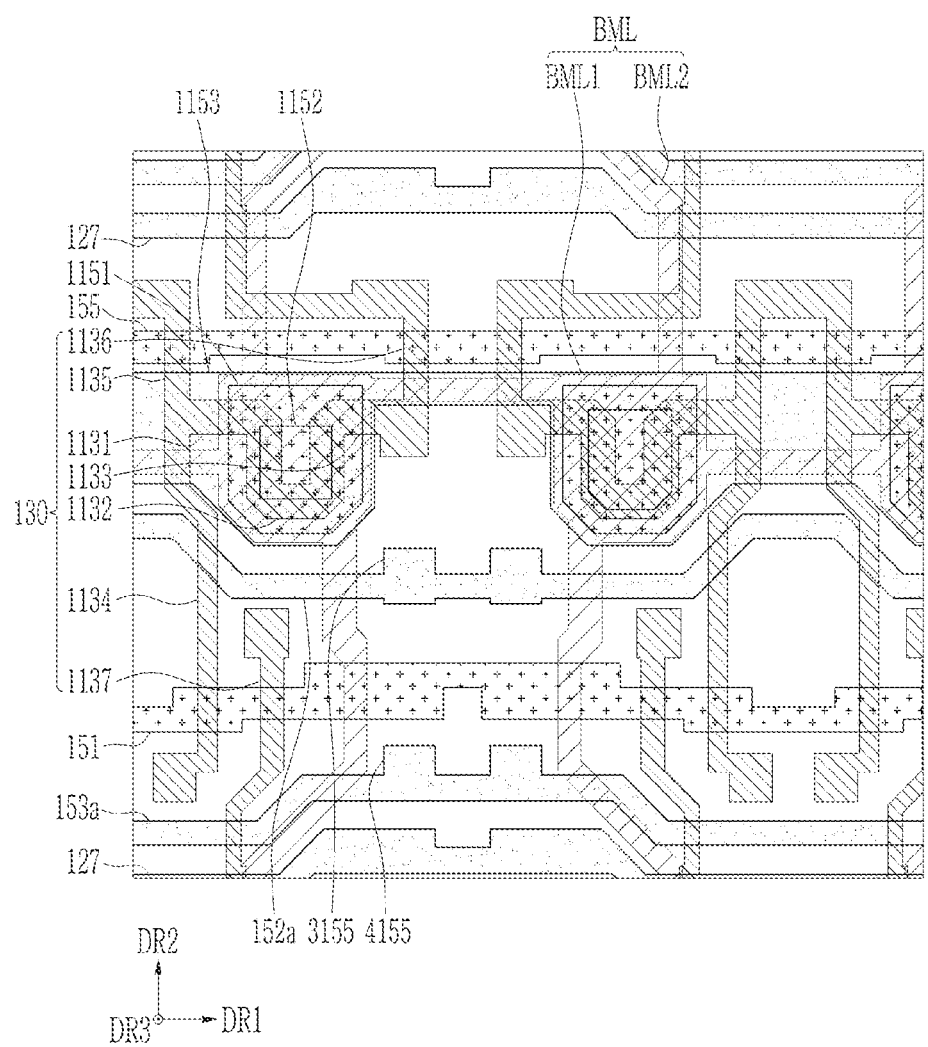

Referring to FIG. 14 and FIG. 24, a second gate conductive layer including a first storage electrode 1153 of the storage capacitor Cst, a lower shielding layer 3155 of the third transistor T3, and a lower shielding layer 4155 of the fourth transistor T4 may be disposed on the second gate insulating layer 142. The lower shielding layers 3155 and 4155 may be disposed under the channels of the third transistor T3 and the fourth transistor T4, respectively, and may serve to shield light or electromagnetic interference provided to the channels from underlying elements.

The first storage electrode 1153 overlaps the gate electrode 1151 of the driving transistor T1 to form the storage capacitor Cst. An opening 1152 is formed in the first storage electrode 1153 of the storage capacitor Cst. The opening 1152 of the first storage electrode 1153 of the storage capacitor Cst may overlap the gate electrode 1151 of the driving transistor T1. The first storage electrode 1153 extends in the horizontal direction (first direction DR1) to be connected to the adjacent first storage electrode 1153.

The lower shielding layer 3155 of the third transistor T3 may overlap a channel 3137 and a gate electrode 3151 of the third transistor T3. The lower shielding layer 4155 of the fourth transistor T4 may overlap a channel 4137 and a gate electrode 4151 of the fourth transistor T4.

The second gate conductive layer may further include a lower second scan line 152*a*, a lower initialization control line 153*a*, and a first initialization voltage line 127. The lower second scan line 152*a*, the lower initialization control line 153*a*, and the first initialization voltage line 127 may substantially extend in the horizontal direction (first direction). The lower second scan line 152*a* may be connected to the lower shielding layer 3155 of the third transistor T3. The lower second scan line 152*a* may be integrally formed with the lower shielding layer 3155 of the third transistor T3. The lower initialization control line 153*a* may be connected to the lower shielding layer 4155 of the fourth transistor T4. The lower initialization control line 153*a* may be integrally formed with the lower shielding layer 4155 of the fourth transistor T4.

The second gate conductive layer GAT2 may include a metal such as copper (Cu), molybdenum (Mo), aluminum (Al), or titanium (T1) or a metal alloy of some of the above metals, and may be formed as a single layer or a multilayer structure.

Referring to FIG. 24, a first interlayer insulating layer 161 may be disposed on the second gate conductive layer including the first storage electrode 1153 of the storage capacitor Cst, the lower shielding layer 3155 of the third transistor T3, and the lower shielding layer 4155 of the fourth transistor T4. The first interlayer insulating layer 161 may include an inorganic insulating layer including a silicon oxide (SiOx), a silicon nitride (SiNx), and a silicon oxynitride (SiOxNy), and The inorganic insulating material may be thickly formed therein.

Figure 15:
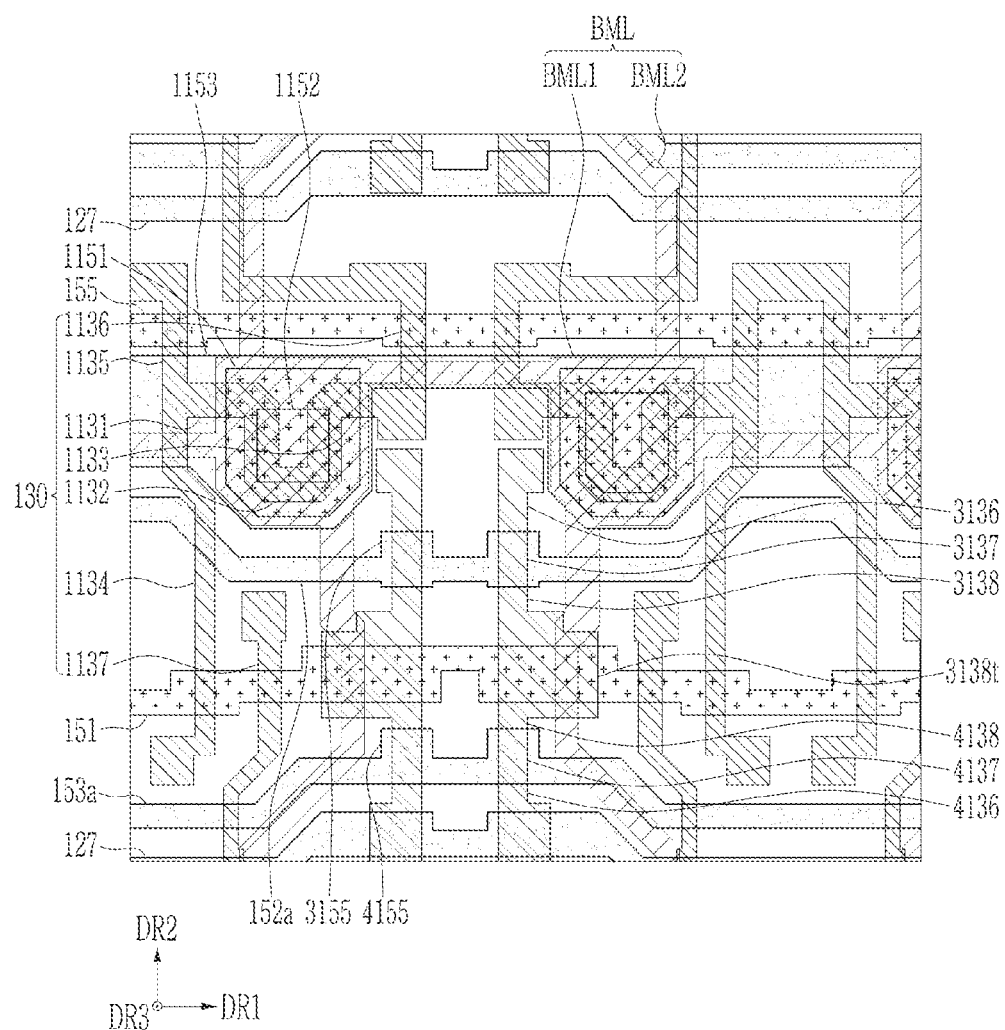

Referring to FIG. 15 and FIG. 24, an oxide semiconductor layer including a channel 3137, a first area 3136, and a second area 3138 of the third transistor 13, and a channel 4137, a first area 4136, and a second area 4138 of the fourth transistor T4 may be disposed on the first interlayer insulating layer 161. The oxide semiconductor layer may include an upper boost electrode 3138*t* of the capacitor $C_{boost}$.

The channel 3137, the first area 3136, and the second area 3138 of the third transistor T3, and the channel 4137, the first area 4136, and the second area 4138 of the fourth transistor T4 may be connected to each other to be integrally formed. The first area 3136 and the second area 3138 of the third transistor T3 are disposed at respective sides of the channel 3137 of the third transistor T3, and the first area 4136 and the second area 4138 of the fourth transistor T4 are disposed at respective sides of the channel 4137 of the fourth transistor T4. The second area 3138 of the third transistor T3 is connected to the second area 4138 of the fourth transistor T4. The channel 3137 of the third transistor T3 overlaps the lower shielding layer 3155, and the channel 4137 of the fourth transistor T4 overlaps the lower shielding layer 4155.

The upper boost electrode 3138*t* of the capacitor $C_{boost}$ is disposed between the second area 3138 of the third transistor T3 and the second area 4138 of the fourth transistor T4. The upper boost electrode 3138*t* of the boost capacitor $C_{boost}$ overlaps a part of the first scan line 151 (also referred to as a lower boost electrode of the boost capacitor $C_{boost}$) to form the boost capacitor $C_{boost}$.

Referring to FIG. 24, a third gate insulating layer 143 may be disposed on the oxide semiconductor layer including the channel 3137, the first area 3136, and the second area 3138 of the third transistor T3, and the channel 4137, the first area 4136, and the second area 4138 of the fourth transistor T4, and the upper boost electrode 3138*t* of the boost capacitor $C_{boost}$.

The third gate insulating layer 143 may be disposed on an entire surface of the oxide semiconductor layer and the first interlayer insulating layer 161. Therefore, the third gate insulating layer 143 may cover upper and lateral surfaces of the channel 3137, the first area 3136, and the second area 3138 of the third transistor T3, of the channel 4137, the first area 4136, and the second area 4138 of the fourth transistor T4, and of the upper boost electrode 3138*t* of the boost capacitor $C_{boost}$. The third gate insulating layer 143 may not be disposed on the entire surface of the oxide semiconductor layer and the first interlayer insulating layer 161. The third gate insulating layer 143 may overlap the channel 3137 of the third transistor T3 and may not overlap the first area 3136 and the second area 3138 of the third transistor T3. The third gate insulating layer 143 may overlap the channel 4137 of the fourth transistor T4 and may not overlap the first area 4136 and the second area 4138 of the fourth transistor T4.

The third gate insulating layer 143 may include an inorganic insulating layer including a silicon oxide (SiOx), a silicon nitride (SiNx), or a silicon oxynitride (SiOxNy).

Figure 16:
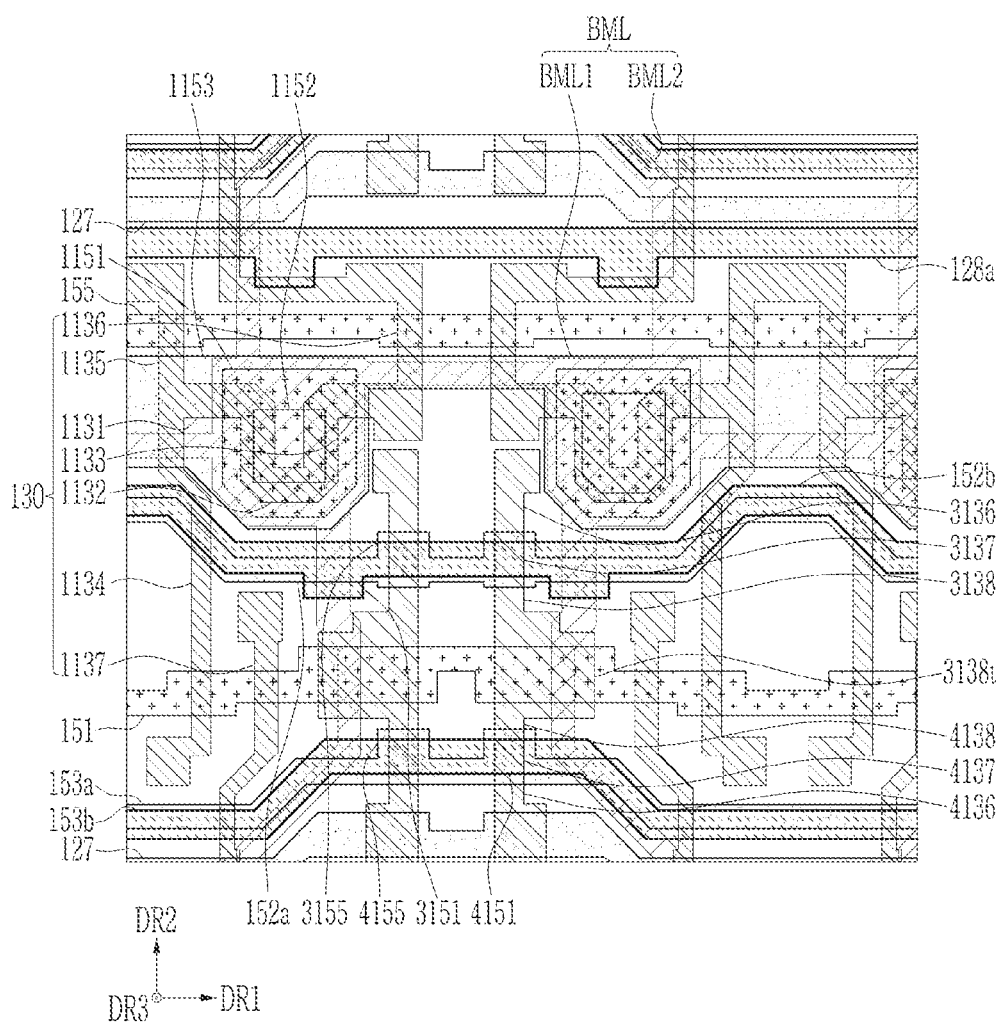

Referring to FIG. 16 and FIG. 24, a third gate conductive layer including the gate electrode 3151 of the third transistor T3 and the gate electrode 4151 of the fourth transistor T4 may be disposed on the third gate insulating layer 143.

The gate electrode 3151 of the third transistor T3 may overlap the channel 3137 of the third transistor T3. The gate electrode 3151 of the third transistor M may overlap the lower shielding layer 3155 of the third transistor T3.

The gate electrode 4151 of the fourth transistor T4 may overlap the channel 4137 of the fourth transistor T4. The gate electrode 4151 of the fourth transistor T4 may overlap the lower shielding layer 4155 of the fourth transistor T4.

The third gate conductive layer may further include an upper second scan line 152b and an upper initialization control line 153b.

The upper second scan line 152b and the upper initialization control line 153b may substantially extend in the horizontal direction (first direction). The upper second scan line 152b forms the second scan line 152 together with the lower second scan line 152a. The upper second scan line 152b may be connected to the gate electrode 3151 of the third transistor T3. The upper second scan line 152b may be integrally formed with the gate electrode 3151 of the third transistor T3. The upper initialization control line 153b forms the initialization control line 153 together with the lower initialization control line 153a. The upper initialization control line 153b may be connected to the gate electrode 4151 of the fourth transistor T4. The upper initialization control line 153b may be integrally formed with the gate electrode 4151 of the fourth transistor T4.

The third gate conductive layer may further include a lower second initialization voltage line 128a. The lower second initialization voltage line 128a may substantially extend in the horizontal direction (first direction DR1) and may transmit the second initialization voltage AVinit.

The third gate conductive layer GAT3 may include a metal such as copper (Cu), molybdenum (Mo), aluminum (Al), or titanium (T1) or a metal alloy of some of the above metals, and may be formed as a single layer or a multilayer structure.

After the third gate conductive layer including the gate electrode 3151 of the third transistor T3 and the gate electrode 4151 of the fourth transistor T4 is formed, through a plasma treatment or doping process, a portion of the oxide semiconductor layer that is covered by the third gate conductive layer is formed as a channel, and a portion of the oxide semiconductor layer that is not covered by the third gate conductive layer is conductive. The channel 3137 of the third transistor 13 may be disposed under the gate electrode 3151 to overlap the gate electrode 3151. The first area 3136 and the second area 3138 of the third transistor T3 may not overlap the gate electrode 3151. The channel 4137 of the fourth transistor T4 may be disposed under the gate electrode 4151 to overlap the gate electrode 4151. The first area 4136 and the second area 4138 of the fourth transistor T4 may not overlap the gate electrode 4151. The upper boost electrode 3138t may not overlap the third gate conductive layer. A transistor including an oxide semiconductor layer may have characteristics of an n-type transistor.

Referring to FIG. 24, a second interlayer insulating layer 162 may be disposed on the third gate conductive layer including the gate electrode 3151 of the third transistor T3 and the gate electrode 4151 of the fourth transistor T4. The second interlayer insulating layer 162 may have a single layered or multi-layered structure. The second interlayer insulating layer 162 may include an inorganic insulating material such as a silicon nitride (SiNx), a silicon oxide (SiOx), and a silicon oxynitride (SiOxNy), and in some embodiments, it may include an organic material.

Figure 17:
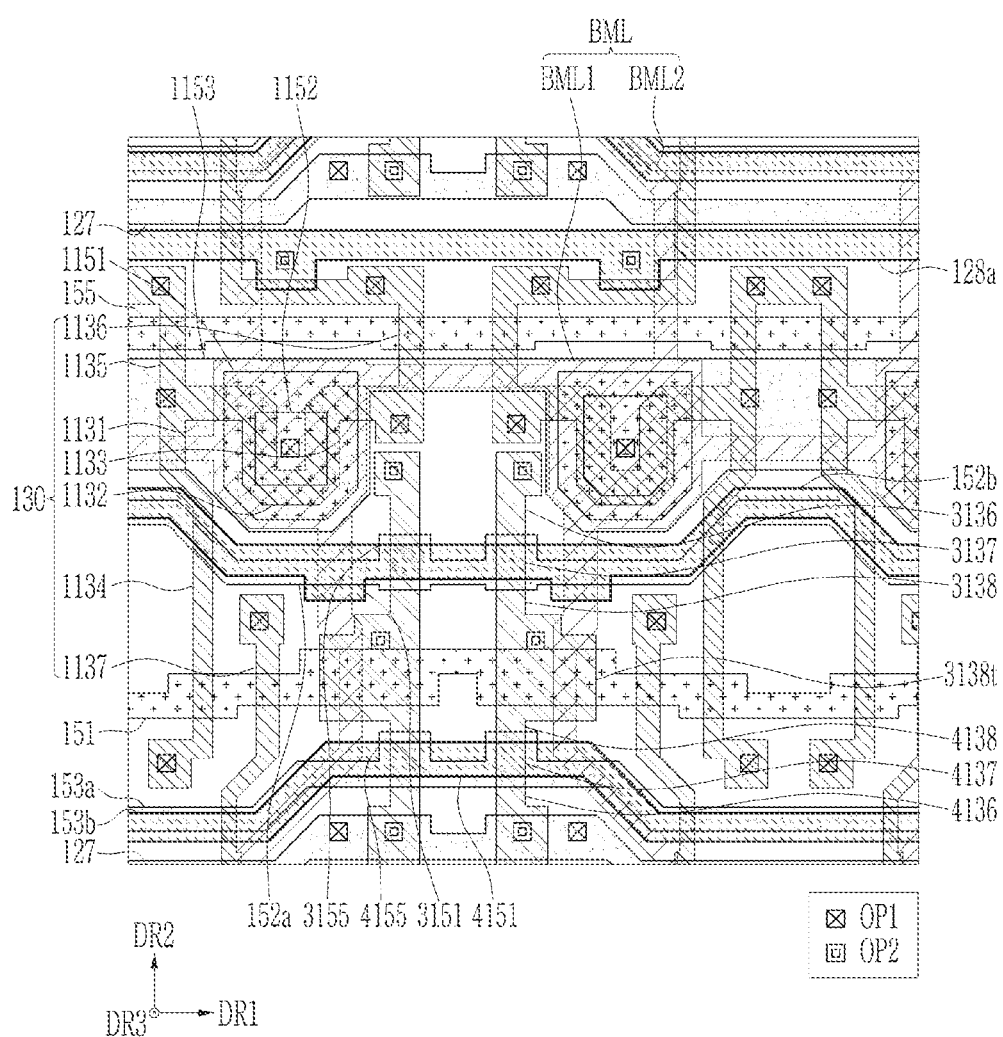

Referring to FIG. 17 and FIG. 24, the two types of openings OP1 and OP2 may be formed in the second interlayer insulating layer 162. The two types of openings OP1 and OP2 may be formed using different masks.

The opening OP1 is formed in at least one of the second interlayer insulating layer 162, the third gate insulating layer 143, the first interlayer insulating layer 161, the second gate insulating layer 142, and the first gate insulating layer 141, and it may expose the first semiconductor layer 130, the first gate conductive layer, or the second gate conductive layer.

The opening OP2 is formed in the second interlayer insulating layer 162 and/or the third gate insulating layer 143, and may expose the oxide semiconductor layer or the third gate conductive layer.

One of the openings OP1 overlaps with the gate electrode 1151 of the driving transistor T1, and may also be formed in the third gate insulating layer 143, the first interlayer insulating layer 161, and the second gate insulating layer 142. In this case, one of the openings OP1 may overlap the opening 1152 of the first storage electrode 1153, and may be disposed inside the opening 1152 of the first storage electrode 1153.

One of the openings OP2 may overlap with the boost capacitor $C_{boost}$, and may be further formed in the third gate insulating layer 143.

Another one of the openings OP1 overlaps with the second area 1133 of the driving transistor T1, and the third opening 3165 may be formed in the third gate insulating layer 143, the first interlayer insulating layer 161, the second gate insulating layer 142, and the first gate insulating layer 141.

Another one of the openings OP2 overlaps with the first area 3136 of the third transistor T3, and may be formed in the third gate insulating layer 143.

Figure 18:
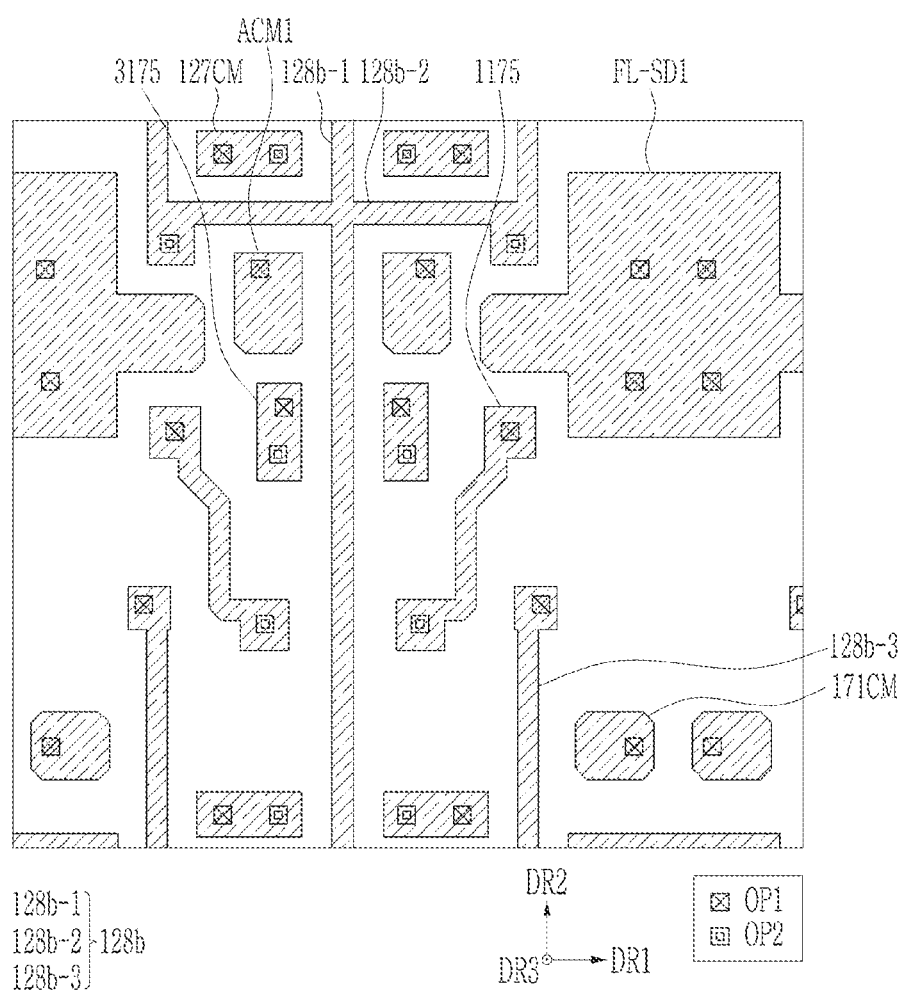
Figure 19:
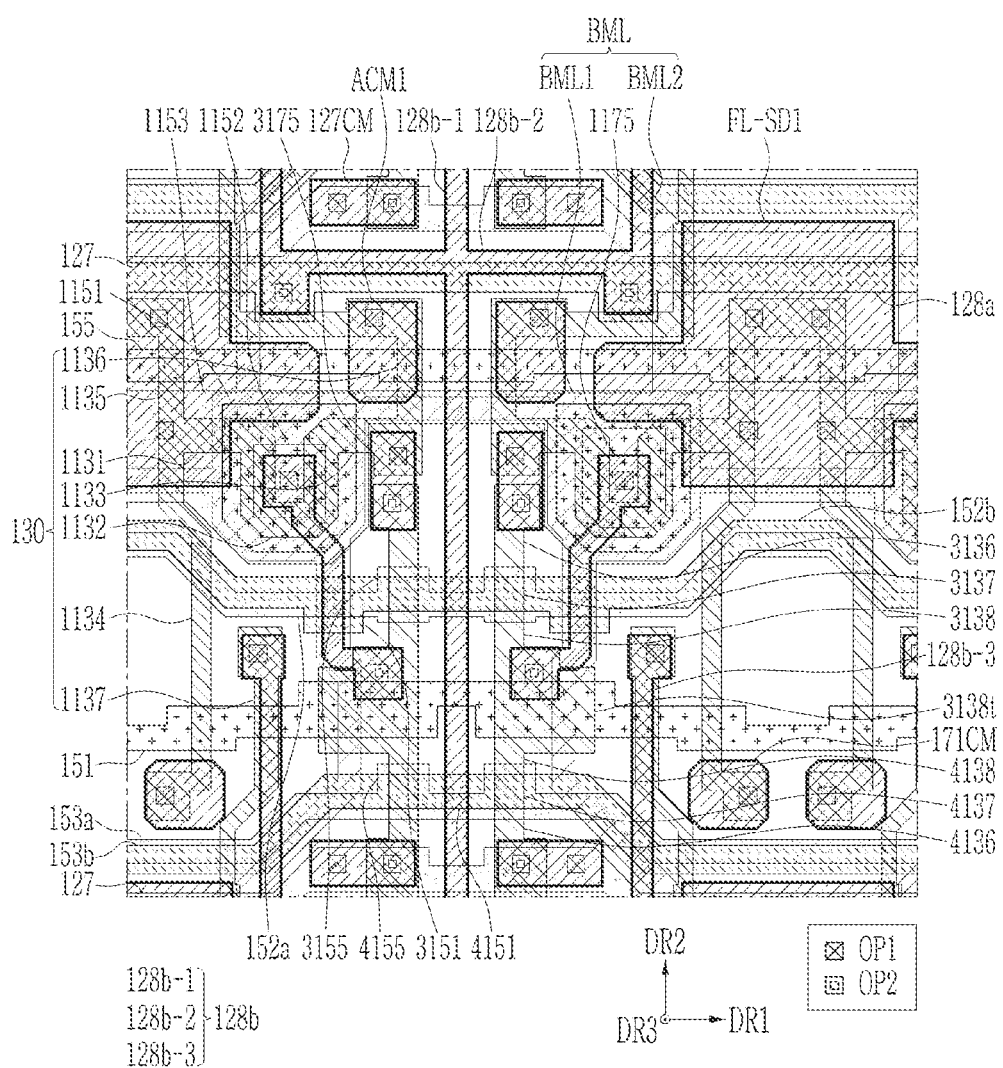

Referring to FIG. 24, FIG. 18, and FIG. 19, a first data conductive layer including a first connection electrode 1175 and a second connection electrode 3175 may be disposed on the second interlayer insulating layer 162. FIG. 18 is a top plan view showing the first data conductive layer and the openings OP and OP2 in FIG. 19. FIG. 19 is a top plan view showing layers below the first data conductive layer.

The first connection electrode 1175 may overlap the gate electrode 1151 of the driving transistor T1. The first connection electrode 1175 may be connected to the gate electrode 1151 of the driving transistor T1 through the openings OP1 and the opening 1152 of the first storage electrode 1153. The first connection electrode 1175 may overlap the boost capacitor $C_{boost}$. The first connection electrode 1175 may be connected to the upper boost electrode 3138t of the boost capacitor $C_{boost}$ through the opening OP2. Accordingly, the gate electrode 1151 of the driving transistor T1 and the upper boost electrode 3138t of the boost capacitor $C_{boost}$ may be connected by the first connection electrode 1175. In this case, the gate electrode 1151 of the driving transistor T1 may be connected to the second area 3138 of the third transistor T3 and the second area 4138 of the fourth transistor T4 by the first connection electrode 1175.

The second connection electrode 3175 may overlap the second area 1133 of the driving transistor T1. The second connection electrode 3175 may be connected to the second area 1133 of the driving transistor T1 through the opening OP1l. The second connection electrode 3175 may overlap the first area 3136 of the third transistor T3. The second connection electrode 3175 may be connected to the first area 3136 of the third transistor T3 through the opening OP2. The second area 1133 of the driving transistor T1 and the first area 3136 of the third transistor T3 may be connected by the second connection electrode 3175.

The first data conductive layer may further include the second initialization voltage line 128b. The second initialization voltage line 128 includes a wire part 128b-1 extending in a vertical direction (second direction DR2), a first extension 128b-2 protruding from opposite sides of the wire part 128b-1 in the horizontal direction (first direction DR1), and a second extension 128b-3 bent from the first extension portion 128b-2 and extending in the vertical direction (the second direction). At a point where the first extension 128b-2 and the second extension 128b-3 meet, they are electrically connected to the second initialization voltage line 128a disposed on the third gate conductive layer through the opening OP2. The second initialization voltage AVinit is transmitted in the horizontal direction (first direction DR1) through the second initialization voltage line 128a and is transmitted in the vertical direction (second direction DR2) through the second initialization voltage line 128b.

An end of the second extension 128b-3 is electrically connected to the portion 1137 of the first semiconductor layer 130 through the opening OP1.

The first data conductive layer may further include connection parts 127CM and 171CM, an anode connecting part ACM1, and an extension FL-SD1.

The connection part 127CM is connected to the first initialization voltage line 127 of the second gate conductive layer through the opening OP1, and is connected to the portion 4136 of the second semiconductor layer (oxide semiconductor layer) through the opening OP2, so that the first initialization voltage Vinit flowing through the first initialization voltage line 127 is transmitted to the fourth transistor T4 of the oxide semiconductor layer.

The connection part 171CM is electrically connected to the portion 1137 of the first semiconductor layer 130, that is, the second transistor T2, through the opening OP1.

The anode connecting part ACM1 is electrically connected to the portion 1136 of the first semiconductor layer 130, that is, the sixth transistor T6, through the opening OP1.

The extension FL-SD1 is wide in order to form a sufficiently flat anode. The extension FL-SD1 is connected to the portion 1135 of the first semiconductor layer 130, that is, the fifth transistor T5, through the opening OP1, and is also electrically connected to the first storage electrode 1153 through the opening OP1.

The first data conductive layer may include a metal such as aluminum (Al), copper (Cu), molybdenum (Mo), or titanium (T1), or a metal alloy of some of the above metals, and may be formed as a single layer or a multilayer structure.

Referring to FIG. 24, the first organic layer 181 may be disposed on the first data conductive layer (including the first connection electrode 1175 and the second connection electrode 3175). The first organic layer 181 may include an organic material that includes one or more of a polyimide, a polyamide, an acryl resin, benzocyclobutene, and a phenol resin.

Figure 21:
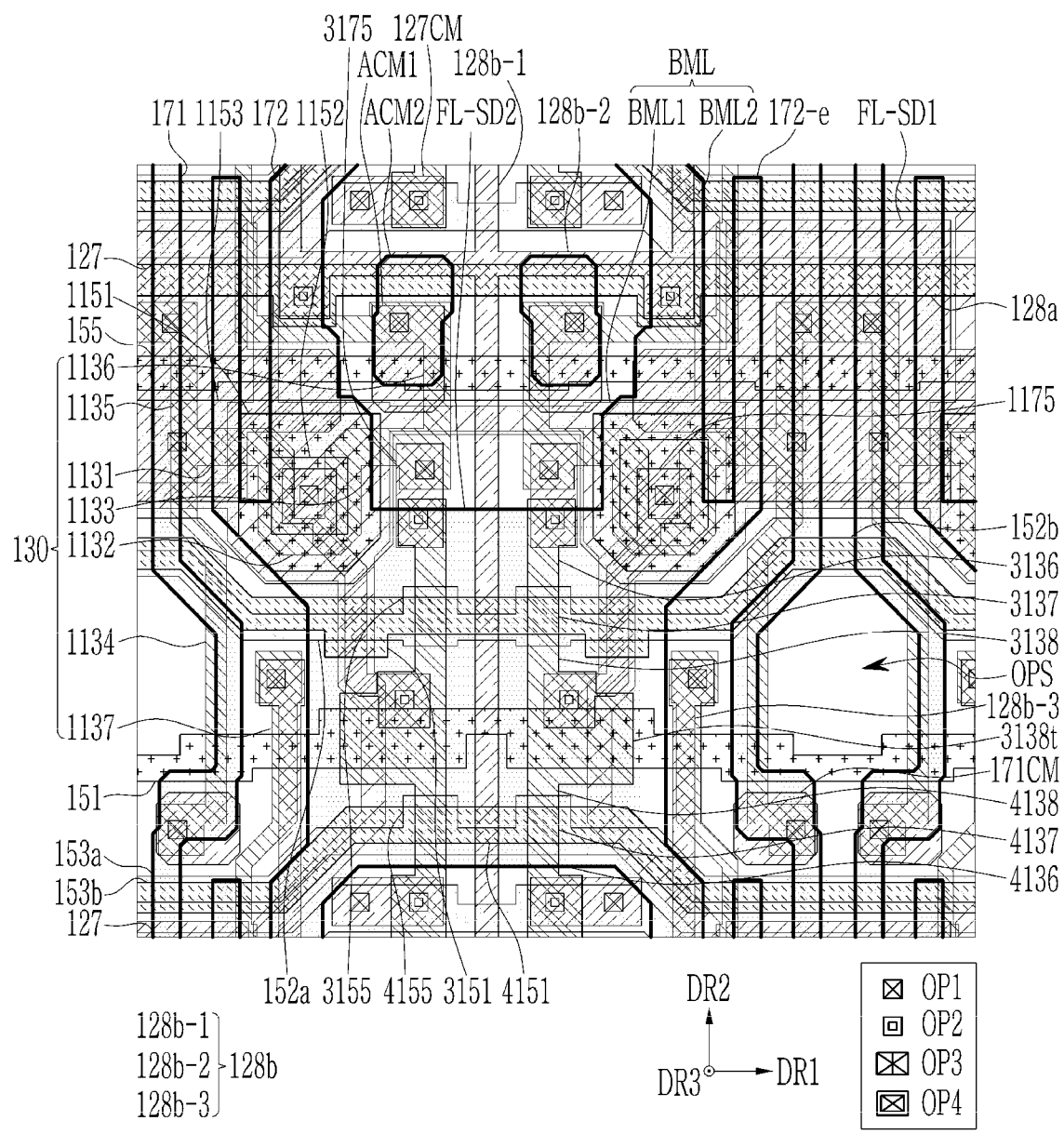

Referring to FIG. 20, FIG. 21, and FIG. 24, the lower organic layer opening OP3 is disposed in the first organic layer 181. The second data conductive layer including the data line 171, the driving voltage line 172, and the anode connecting part ACM2 may be disposed on the first organic layer 181. The second organic layer 182 and the third organic layer 183 are disposed on the second data conductive layer, and the anode-connecting opening OP4 is formed in the second organic layer 182 and the third organic layer 183. The anode connecting part ACM2 is electrically connected to the anode (Anode) through the anode-connecting opening OP4. FIG. 20 is a top plan view showing the second data conductive layer and the openings OP3 and OP4 in FIG. 21. FIG. 21 is a top plan view showing the second data conductive layer and other layers.

Referring to FIG. 20 and FIG. 21, the lower organic layer opening OP3 overlaps with and exposes the connection part 171CM, the anode connecting part ACM1, and the extension FL-SD1 of the first data conductive layer.

The second data conductive layer may include the data line 171, the driving voltage line 172, and the anode connecting part ACM2.

The data line 171 and the driving voltage line 172 may substantially extend in the vertical direction (second direction DR2). The data line 171 is connected to the connection part 171CM of the first data conductive layer through the lower organic layer opening OP3, to be connected to the second transistor 12. The driving voltage line 172 is electrically connected to the fifth transistor T5 and the first storage electrode 1153 through the extension FL-SD1 of the first data conductive layer through the lower organic layer opening OP3. The anode connecting part ACM2 is electrically connected to the anode connecting part ACM1 of the first data conductive layer through the opening OP3, and is electrically connected to the sixth transistor T6.

Referring to FIG. 20, the driving voltage line 172 further includes the extension FL-SD2 and a protruding wire part 172-e, and may not overlap with the anode connecting part ACM2.

The extension FL-SD2 is wide in order to form a sufficiently flat anode.

Two protruding wire parts 172-e of two driving voltage line 172 are formed at opposite sides of two data lines 171 so as to enable a sufficiently flat overlying anode; four wires 171 and 172-e are disposed below the anode.

The anode is sufficiently flat due to the underlying structure, including the extension FL-SD1 and the wire part 128b-1 of the first data conductive layer, the extension FL-SD2 of the second data conductive layer, the data line 171, the wire part 172-e, and the organic layers 181, 182, and 183.

The extension FL-SD1 and the extension FL-SD2 are electrically connected to the driving voltage line 172 to receive the driving voltage ELVDD.

The second data conductive layer SD2 may include a metal such as aluminum (Al), copper (Cu), molybdenum (Mo), or titanium (Ti), or a metal alloy of some of the above metals, and may be formed as a single layer or a multilayer structure.

Referring to FIG. 24, the second organic layer 182 and the third organic layer 183 are disposed on the second data conductive layer. The second organic layer 182 and the third organic layer 183 may be insulating layers, and may include one or more of a polyimide, a polyamide, an acryl resin, benzocyclobutene, and a phenol resin. The third organic layer 183 may be optional.

The anode-connecting opening OP4 is formed in the second organic layer 182 and the third organic layer 183. Through the anode-connecting opening OP4, the anode (Anode) and the anode connecting part ACM2 are electrically connected to each other.

Figure 22:
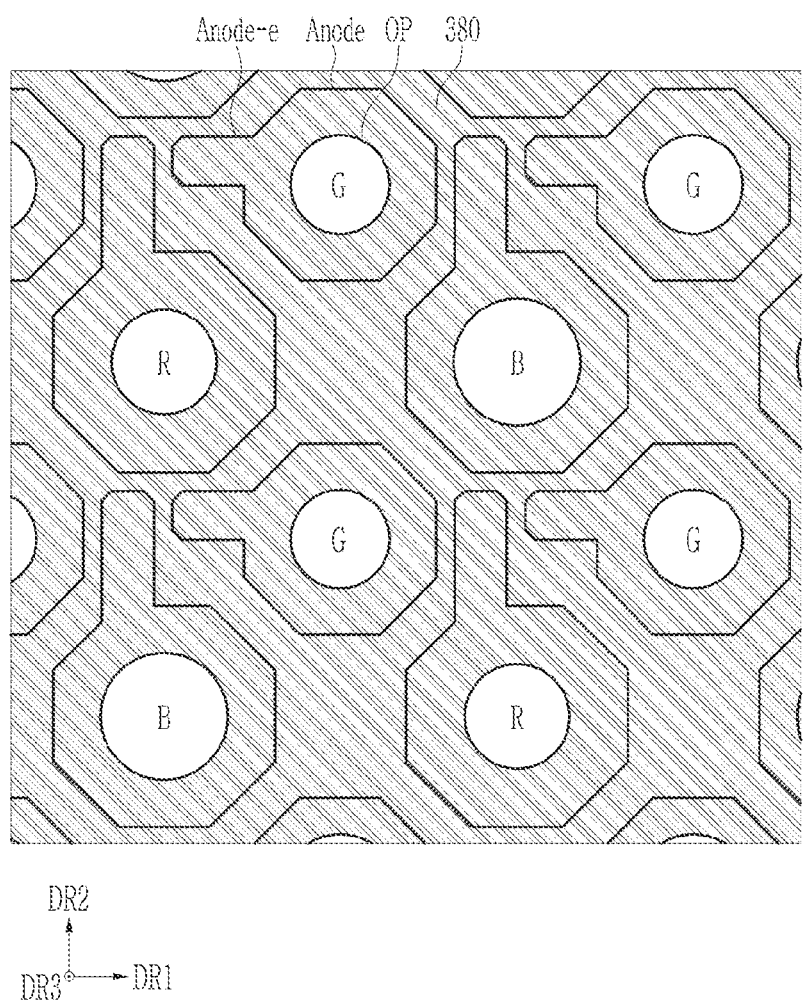

Referring to FIG. 22, the anode (Anode) is formed on the third organic layer 183. The anode (Anode) may further include an extension (Anode-e) to receive a current from the pixel circuit part through the anode-connecting opening OP4.

Referring to FIG. 22 and FIG. 24, the black pixel defining layer 380 is disposed on the anode (Anode), and the opening OP of the black pixel defining layer 380 partially exposes the anode (Anode). The extension (Anode-e) of the anode (Anode) is not exposed by the opening OP of the black pixel defining layer 380. The extension (Anode-e) overlaps with the black pixel defining layer 380 in a plan view of the display panel DP. The anode-connecting opening OP4 overlaps with the black pixel defining layer 380 in a plan view of the display panel DP.

Referring to FIG. 23, the anode-connecting opening OP4 does not overlap with the opening OP of the black pixel defining layer 380 and the opening OPBM of the light blocking layer 220 in a plan view of the display panel DP. The anode-connecting opening OP4 overlaps with the black pixel defining layer 380 and the light blocking layer 220.

First lower organic layer openings of the lower organic layer openings OP3 overlap with the opening OPBM of the light blocking layer 220 in a plan view of the display panel DP. Second lower organic layer openings of the lower organic layer openings OP3 overlap with the light blocking layer 220 in a plan view of the display panel DP. All of the lower organic layer openings OP3 overlap with the black pixel defining layer 380 in a plan view of the display panel DP.

Supported by the extension FL-SD1 of the first data conductive layer and the extension FL-SD2 of the second data conductive layer disposed below the anode (Anode), at least a portion of the anode (Anode) exposed by the opening OP of the black pixel defining layer 380 may be sufficiently flat. Advantageously, external light is not asymmetrically reflected, and unwanted color spread (color separation) may be prevented.

FIG. 24 illustrates a cross-sectional view of a light emitting display device according to an embodiment.

FIG. 24 illustrates a stacked structure of the second element area OPS of the first element area DA2 in addition to the stacked structure of the display area DA.

The display area DA may include a pixel circuit part disposed below the second organic layer 182 and the third organic layer 183, and may include a light emitting diode disposed above the third organic layer 183 and below the encapsulation layer 400.

In the second element area OPS, transparent layers are formed to allow light to pass through, and no conductive layer or semiconductor layer is disposed. An opening (hereinafter also referred to as an additional opening or light transmitting opening) is formed in each of a black pixel defining layer 380, a light blocking layer 220, and a color filter 230 at a position corresponding to the second element area OPS so that light is not blocked.

The buffer layer 111, which is an inorganic insulating layer, is disposed on the substrate 110. The first gate insulating layer 141 and the second gate insulating layer 142, which are the inorganic insulating layers, are sequentially disposed on the buffer layer 111. The first interlayer insulating layer 161, the third gate insulating layer 143, and the second interlayer insulating layer 162, which are inorganic insulating layers, are sequentially stacked on the second gate insulating layer 142.

The first organic layer 181, the second organic layer 182, and the third organic layer 183, which are organic insulating layers, are sequentially stacked on the second interlayer insulating layer 162.

The functional layer FL may be disposed on the third organic layer 183. The cathode (Cathode) may be disposed on the functional layer FL.

The encapsulation layer 400 is disposed on the cathode (Cathode). The sensing insulating layers 501, 510, and 511 are sequentially disposed on the encapsulation layer 400. The encapsulation layer 400 may have a triple-layered structure including the first inorganic encapsulation layer 401, the organic encapsulation layer 402, and the second inorganic encapsulation layer 403 shown in FIG. 6. All of the sensing insulating layers 501, 510, and 511 may be inorganic insulating layers.

Referring to FIG. 6, FIG. 9, and FIG. 24, the light blocking layer 220 and the additional openings OPBM-1 and OPC-1 of the red color filter 230R are disposed above the encapsulation layer 400 and above the sensing insulating layers 501, 510, and 511. The additional opening OP-1 of the black pixel defining layer 380 is disposed between the third organic layer 183 and the functional layer FL.

The planarization layer 550 may be disposed on the sensing insulating layers 501, 510, and 511.

In the second element area OPS, the metal layer BML, a first semiconductor layer ACT1, the first gate conductive layer GAT1, the second gate conductive layer GAT2, an oxide semiconductor layer ACT2, the third gate conductive layer GAT3, the first data conductive layer SD1, the second data conductive layer, and the anode (Anode) are not disposed. The light emitting layer EML and the sensing electrodes 540 and 541 are not formed in the second element area OPS.

In the second element area OPS, the additional (light transmitting) openings (see FIG. 9) are formed in the black pixel defining layer 380, the light blocking layer 220, and the color filter 230.

In embodiments, at least two organic layers may be formed; an anode-connecting opening may be disposed in the upper organic layer disposed farther from the substrate, and a lower organic layer opening may be disposed in the lower organic layer closer to the substrate.

A reflection adjusting layer may be disposed on the light blocking layer 220. The reflection adjusting layer may selectively absorb light of a wavelength of a partial band among light reflected inside the display device or light incident outside the display device. The reflection adjusting layer may fill the opening OP.

For example, the reflection adjusting layer absorbs a first wavelength region of 490 nm to 505 nm and a second wavelength region of 585 nm to 600 nm, and thus light transmittance in the first wavelength region and second wavelength region may be 40% or less. The reflection adjusting layer may absorb light of a wavelength outside the emission wavelength range of red, green, or blue emitted from the light emitting diode ED. As described, the reflection adjusting layer absorbs light of a wavelength that does not belong to a wavelength range of red, green, or blue emitted from the light emitting diode, thereby preventing or minimizing the reduction in luminance of the display device and simultaneously preventing or minimizing the deterioration of the luminous efficiency and improving visibility of the display device.

In the embodiment, the reflection adjusting layer may be provided as an organic material layer including a dye, a pigment, or combination thereof. The reflection adjusting layer may contain a tetraazaporphyrin (TAP)-based compound, a porphyrin-based compound, a metal porphyrin-based compound, an oxazine-based compound, and a squarylium-based compound, a triarylmethane compound, a polymethine compound, an anthraquinone compound, a phthalocyanine compound, an azo compound, a perylene compound, a xanthene-based compound, a diammonium-based compound, a dipyrromethene-based compound, a cyanine-based compound, and a combination thereof.

In the embodiment, the reflection adjusting layer may have transmittance of about 64% to 72%. The transmittance of the reflection adjusting layer may be adjusted according to the content of the pigment and/or dye included in the reflection adjusting layer.

According to embodiments, the reflection adjusting layer may not be disposed in the component area. In addition, an embodiment including the reflection adjusting layer may further include a capping layer and a low reflection layer disposed between the cathode (Cathode) and the encapsulation layer 400.

The capping layer may serve to improve the luminous efficiency of the light emitting diode ED by the principle of constructive interference. The capping layer may include, for example, a material having a refractive index of 1.6 or more for light having a wavelength of 589 nm.

The capping layer may be an organic capping layer including an organic material, an inorganic capping layer including an inorganic material, or a composite capping layer including an organic material and an inorganic material. For example, the capping layer may contain a carbocyclic compound, a heterocyclic compound, an amine group-containing compound, a porphine derivative, a phthalocyanine derivative, a naphthalocyanine derivative, an alkali metal complex, alkaline earth metal complexes, or any combination thereof. The carbocyclic compounds, the heterocyclic compounds, and the amine group-containing compounds may be optionally substituted with substituents including O, N, S, Se, Si, F, Cl, Br, I, or any combination thereof.

A low reflection layer may be disposed on the capping layer. The low reflective layer may overlap a front surface of the substrate 110.

The low reflective layer may include an inorganic material having low reflectance, and in an embodiment, it may include a metal or metal oxide. When the low reflective layer contains a metal, it may include, for example, ytterbium (Yb), bismuth (Bi), cobalt (Co), molybdenum (Mo), titanium (Ti), zirconium (Zr), aluminum (Al), chromium (Cr), niobium (Nb), platinum (Pt), tungsten (W), indium (In), tin (Sn), iron (Fe), nickel (Ni), tantalum (Ta), manganese (Mn), and it may include zinc (Zn), germanium (Ge), silver (Ag), magnesium (Mg), gold (Au), copper (Cu), calcium (Ca), or a combination thereof. In addition, when the low reflective layer contains a metal oxide, it may include, for example, $SiO_2$, $TiO_2$, $ZrO_2$, $Ta_2O_5$, $HfO_2$, $Al_2O_3$, $ZnO$, $Y_2O_3$, $BeO$, $MgO$, $PbO_2$, $WO_3$, $SiN_x$, $LiF$, $CaF_2$, $MgF_2$, $CdS$, or a combination thereof.

In the embodiment, an absorption coefficient (k) of the inorganic material included in the low reflective layer may be 4.0 or less and 0.5 or more ($0.5 \leq k \leq 4.0$). In addition, the inorganic material included in the low reflective layer may have a refractive index (n) of 1 or more ($n \leq 1.0$).

The low reflective layer induces destructive interference between the light incident into the display device and the light reflected from the metal disposed under the low reflective layer, thereby reducing reflection of external light. Accordingly, the display quality and visibility of the display device can be improved by reducing the reflection of the external light of the display device through the low reflective layer.

According to embodiments, the capping layer may not be formed, and then the low reflective layer may be contact the cathode (Cathode) directly.

The encapsulation layer is disposed on the low reflective layer, other structures may be the same as FIGS. 6 and 24.

While examples of embodiments have been described, practical embodiments are not limited to the described embodiments. Practical embodiments are intended to cover various modifications and equivalent arrangements within the scope of the appended claims.

DESCRIPTIONS OF SYMBOLS

| | |
|---|---|
| OP4: anode-connecting opening | OP3: lower organic layer opening |
| 380: black pixel defining layer | |
| OP: opening of black pixel defining layer | |
| 220: light blocking layer | |
| OPBM: opening of light blocking layer | |
| 230R, 230G, 230B: color filter | 230R-m: main part |
| 230R-1: overlapping part | OPC: opening of color filter |
| 540, 541: sensing electrode | |
| OPBM-1: additional opening of light blocking layer | |
| OP-1: additional opening of black pixel defining layer | |
| OPC-1: additional opening for color filter | |
| FL-SD1, FL-SD2: extension | |
| DP: display panel | OPS: second element area |
| DA1: first display area | DA2: first element area |
| 385, 385-1, 385-2: spacer | BML: metal layer |
| EL: light emitting layer | FL: functional layer |
| 110: substrate | 111: buffer layer |
| 141, 142, 143: gate insulating layer | 161, 162: interlayer insulating layer |
| 180, 181, 182, 183: organic layer | 400: encapsulation layer |
| 401, 403: inorganic encapsulation layer | |
| 402: organic encapsulation layer | |
| 501, 510, 511: sensing insulating layer | |
| 550: planarization layer | |
| 127, 128, 151, 152, 153, 155, 171, 172, 741: wire | |

What is claimed is:

1. A display device, comprising:
a substrate;
an organic layer overlapping the substrate and having an anode-connecting opening;
an anode disposed on the organic layer and partially disposed inside the anode-connecting opening;
a pixel defining layer having an anode-exposing opening that exposes the anode;
a cathode overlapping the pixel defining layer and the anode;
a light emitting layer disposed between the anode and the cathode;
an encapsulation layer covering the cathode;
a light blocking layer overlapping the encapsulation layer and having a first blocking layer opening;
a color filter set filling the first blocking layer opening; and
a sensing electrode at least partially covered by the light blocking layer,
wherein the anode-connecting opening overlaps with each of the sensing electrode, the pixel defining layer, and the light blocking layer in a plan view of the display device, and wherein the light blocking layer completely covers the anode-connecting opening in a plan view.

2. The display device of claim 1, wherein a center of the anode-connecting opening overlaps with the sensing electrode in the plan view of the display device.

3. The display device of claim 2, wherein:
the organic layer includes a first organic layer, a second organic layer, and a third organic layer overlapping each other; and
the anode directly contacts each of the second organic layer and the third organic layer.

4. The display device of claim 3, further comprising an anode connecting part disposed on the first organic layer,
wherein the anode is connected to the anode connecting part through the anode-connecting opening.

5. The display device of claim 4, wherein:
the first organic layer includes a first organic layer opening and a second organic layer opening;
the first organic layer opening overlaps with the pixel definition film and does not overlap with the light blocking layer in the plan view of the display device; and
the second organic layer opening overlaps each of the pixel defining layer and the light blocking layer in the plan view of the display device.

6. The display device of claim 5, wherein:
the second organic layer opening overlaps with each of the anode connecting part and the sensing electrode in the plan view of the display device; and
the first organic layer opening does not overlap with the sensing electrode in the plan view of the display device.

7. The display device of claim 5, wherein:
the color filter set includes a first color filter, a second color filter, and a third color filter of a first color, a second color, and a third color, respectively;
the first color, the second color, and the third color are different from each other;
the first color filter includes two color filter openings spaced from each other, a main part filling the first blocking layer opening and spaced from the two color filter openings, and an overlapping part directly connected to the main part; and
the second color filter and the third color filter are respectively disposed in the two color filter openings.

8. The display device of claim 7, wherein the overlapping part overlaps the light blocking layer.

9. The display device of claim 7, wherein the anode-connecting opening overlaps with the overlapping part in the plan view of the display device.

10. The display device of claim 9, wherein:
the first organic layer opening overlaps with the second color filter in the plan view of the display device; and
the first color filter is a red color filter, the second color filter is a green color filter, and the third color filter is a blue color filter.

11. The display device of claim 10, wherein the substrate includes a light transmitting area; and
each of the pixel defining layer, the light blocking layer, and the first color filter includes a light-transmitting opening corresponding to the light transmitting area.

12. The display device of claim 11, wherein the sensing electrode includes an oblique part and a connection part;

the oblique part extends oblique relative to an edge of the display device in the plan view of the display device; and
the connection part has a U-shaped structure and partially surrounds the light transmitting area.

13. The display device of claim 12, wherein the anode-connecting opening of the organic layer overlaps with the oblique part of the sensing electrode in the plan view of the display device.

14. The display device of claim 11, wherein portions of a buffer layer, a first gate insulating layer, a second gate insulating layer, a first interlayer insulating layer, a third gate insulating layer, a second interlayer insulating layer, the first organic layer, the second organic layer, and the third organic layer are sequentially stacked on the light transmitting area of the substrate.

15. The display device of claim 14, wherein:
portions of a functional layer, the cathode, the encapsulation layer, and a sensing insulating layer are stacked on the third organic layer on the light transmitting area of the substrate;
the sensing insulating layer is disposed between the light blocking layer and the encapsulation layer; and
the light transmitting opening of the pixel defining layer is disposed between the third organic layer and the functional layer.

16. The display device of claim 3, further comprising:
a first data conductive layer disposed between the substrate and the first organic layer and including a first extension; and
a second data conductive layer disposed on the first organic layer and including the anode connecting part and a second extension,
wherein each of the first extension and the second extension overlaps with the anode in the plan view of the display device.

17. The display device of claim 1, further comprising a spacer disposed between the pixel defining layer and the cathode,
wherein the spacer includes a first part and includes a second part shorter than the first part in a direction perpendicular to the substrate and integrally formed with the first part.

18. The display device of claim 17, wherein the second part overlaps with the anode-connecting opening in the plan view of the display device.

19. The display device of claim 17, wherein:
the first part does not overlap with the anode-connecting opening in the plan view of the display device; and
the second part partially overlaps with the anode-connecting opening in the plan view of the display device.

20. The display device of claim 1, wherein the substrate includes two light transmitting areas that are spaced from each other;
the sensing electrode includes an oblique part and two U-shaped structures;
the oblique part extends oblique relative to one or more members of the two U-shaped structures; and
the two U-shaped structures respectively partially surround the two light transmitting areas in the plan view of the display device and are electrically connected to each other through the oblique part.

21. An electronic device including a display device, the display device comprising:
a substrate;

an organic layer overlapping the substrate and having an anode-connecting opening;
an anode disposed on the organic layer and partially disposed inside the anode-connecting opening;
a pixel defining layer having an anode-exposing opening that exposes the anode;
a cathode overlapping the pixel defining layer and the anode;
a light emitting layer disposed between the anode and the cathode;
an encapsulation layer covering the cathode;
a light blocking layer overlapping the encapsulation layer and having a first blocking layer opening;
a color filter set filling the first blocking layer opening; and
a sensing electrode at least partially covered by the light blocking layer,
wherein the anode-connecting opening overlaps with each of the sensing electrode, the pixel defining layer, and the light blocking layer in a plan view of the display device, and
wherein the light blocking layer completely covers the anode-connecting opening in a plan view.

* * * * *